US009898951B2

(12) United States Patent
Schwarz et al.

(10) Patent No.: US 9,898,951 B2
(45) Date of Patent: Feb. 20, 2018

(54) DISPLAY SCREEN AND METHOD FOR SECURE REPRESENTATION OF INFORMATION

(71) Applicants: siOPTICA GmbH, Jena (DE); SECCO GmbH, Lengefeld (DE)

(72) Inventors: Juergen Schwarz, Apolda (DE); Sven Emmrich, Leubsdorf (DE); Ullrich Daehnert, Lengefeld (DE)

(73) Assignees: Sioptica GmbH, Jena (DE); Secco GmbH, Lengefeld (DE)

( * ) Notice: Subject to any disclaimer, the term of this patent is extended or adjusted under 35 U.S.C. 154(b) by 92 days.

(21) Appl. No.: 14/888,339

(22) PCT Filed: Apr. 4, 2014

(86) PCT No.: PCT/EP2014/056804
§ 371 (c)(1),
(2) Date: Oct. 30, 2015

(87) PCT Pub. No.: WO2014/177342
PCT Pub. Date: Nov. 6, 2014

(65) Prior Publication Data
US 2016/0071448 A1    Mar. 10, 2016

(30) Foreign Application Priority Data

Apr. 30, 2013   (DE) .................... 10 2013 007 948

(51) Int. Cl.
*G02F 1/1347*    (2006.01)
*G09G 3/20*    (2006.01)
(Continued)

(52) U.S. Cl.
CPC ............. *G09G 3/20* (2013.01); *G02F 1/1333* (2013.01); *G02F 1/13306* (2013.01);
(Continued)

(58) Field of Classification Search
CPC ................. G02F 1/13306; G02F 2001/133374
See application file for complete search history.

(56) References Cited

U.S. PATENT DOCUMENTS 5,528,319 A * 6/1996 Austin .................... H04N 5/72
348/818
6,211,930 B1 4/2001 Sautter et al.
(Continued)

FOREIGN PATENT DOCUMENTS

JP       2005-134678 A    5/2005
TW        I 220204 B      8/2004
(Continued)

OTHER PUBLICATIONS

PCT International Search Report for PCT/EP2014/056804, dated Sep. 30, 2014, 8 pgs.
(Continued)

*Primary Examiner* — Timothy L Rude
(74) *Attorney, Agent, or Firm* — Patterson Thuente Pedersen, P.A.

(57) ABSTRACT

A display screen for secure representation of information comprising a background grid with light-emitting background grid elements of a first type and light-emitting or light-blocking background grid elements of a second type. A foreground grid (4) having completely light-transmissive foreground grid elements and light-attenuating foreground grid elements is arranged in front of the background grid. The lateral dimensions of the foreground grid elements, the distance and the lateral position of the foreground grid are matched in relation to the background grid in such a manner that a viewer looking at the foreground grid perceives coded information in a decoded form, on the basis of a contrast difference and/or color difference in relation to those fields of the background grid that are base-coded, only from one direction of view or one view angle range of up to ±50°
(Continued)

about the view direction. Further, a method for secure representation of information on such a display screen.

21 Claims, 14 Drawing Sheets

(51) Int. Cl.
    *G02F 1/133*     (2006.01)
    *G02F 1/1333*     (2006.01)
(52) U.S. Cl.
    CPC ............ *G02F 2001/133374* (2013.01); *G09G 2300/023* (2013.01); *G09G 2320/068* (2013.01); *G09G 2358/00* (2013.01)

(56) References Cited

U.S. PATENT DOCUMENTS

| | | | |
|---|---|---|---|
| 7,675,568 | B2 | 3/2010 | Uchiyama |
| 9,058,638 | B2* | 6/2015 | Blurfrushan ............... G06T 9/00 |
| 2003/0026449 | A1* | 2/2003 | Yerazunis ................ G09G 5/00 |
| | | | 382/100 |
| 2005/0088454 | A1 | 4/2005 | Lin |
| 2005/0204138 | A1 | 9/2005 | Chiu |
| 2006/0290594 | A1 | 12/2006 | Engel et al. |
| 2007/0252838 | A1* | 11/2007 | Hains ..................... G06K 15/02 |
| | | | 345/467 |
| 2008/0074347 | A1 | 3/2008 | Sumiyoshi |
| 2009/0073087 | A1* | 3/2009 | Janson ............... G02B 27/2214 |
| | | | 345/55 |
| 2011/0187747 | A1* | 8/2011 | McCarthy .......... H04N 1/32219 |
| | | | 345/634 |
| 2012/0173792 | A1 | 7/2012 | Lassa et al. |
| 2012/0260307 | A1 | 10/2012 | Sambamurthy et al. |
| 2015/0341672 | A1* | 11/2015 | Lee ........................ H04N 19/91 |
| | | | 375/240.12 |
| 2015/0371582 | A1* | 12/2015 | Chia ....................... G06F 21/31 |
| | | | 382/100 |

FOREIGN PATENT DOCUMENTS

| | | |
|---|---|---|
| TW | I 252661 B | 4/2006 |
| TW | 201227506 A | 7/2012 |
| WO | WO 2009/050505 A1 | 4/2009 |
| WO | WO 2012/033583 A1 | 3/2012 |
| WO | WO 2013/049088 A1 | 4/2013 |

OTHER PUBLICATIONS

PCT International Search Report for PCT/EP2014/056804, dated Sep. 30, 2014, 3 pgs.
PCT/ISA/237 for PCT/EP2014/056804, dated Apr. 30, 2013, 17 pgs.
Yamamoto H et al: "Secure information display by use of composite visual cryptography of a secret image and identification images", IDW/AD, VHF1-5, London UK, Jan. 1, 2005 (Jan. 1, 2005), pages.
Yamamoto, Hirotsugu; Suyama, Shiro: "Spatial-coding-based 2-D / 3-D P-P display", SPIE, PO Box 10 Bellingham WA 98227-0010 USA, vol. 7237, Feb. 5, 2009 (Feb. 5, 2009) , XP040493782.
English Translation of PCT International Preliminary Report on Patentability for PCT/EP2014/056804, dated Nov. 12, 2015, 23 pages.
Taiwan Search Report for Application No. 103115309, dated Jun. 29, 2016, including English Language Translation (6 pages total).
Yamamoto et al., "Secure information display by use of composite visual cryptography of a secret image and identification images," IDW/AD, VHF1-5, London, UK, Jan. 1, 2005 (pp. 793-796).

* cited by examiner

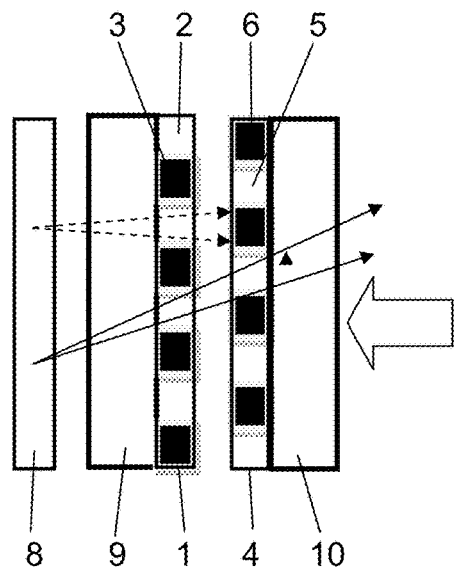
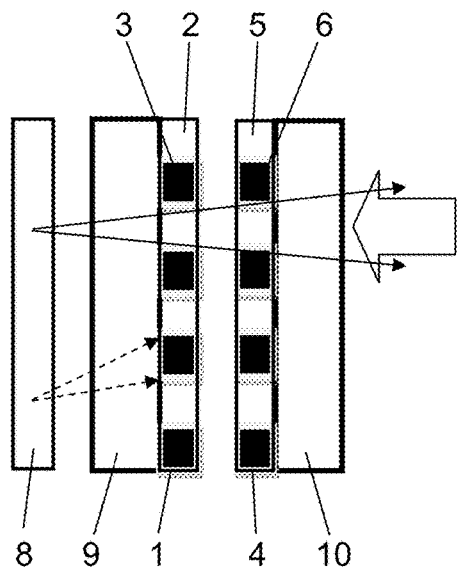
Fig.4a  Fig.4b
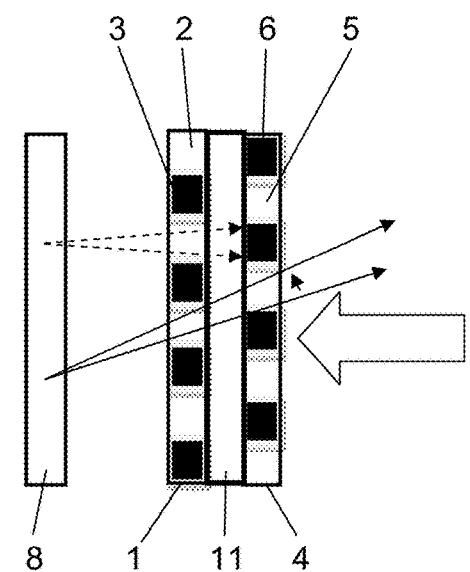
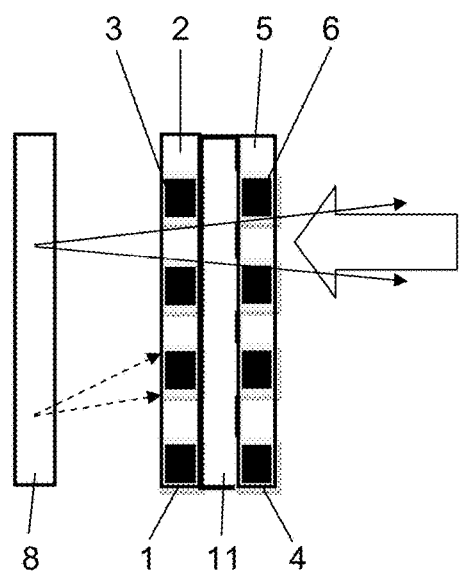
Fig.5a  Fig.5b

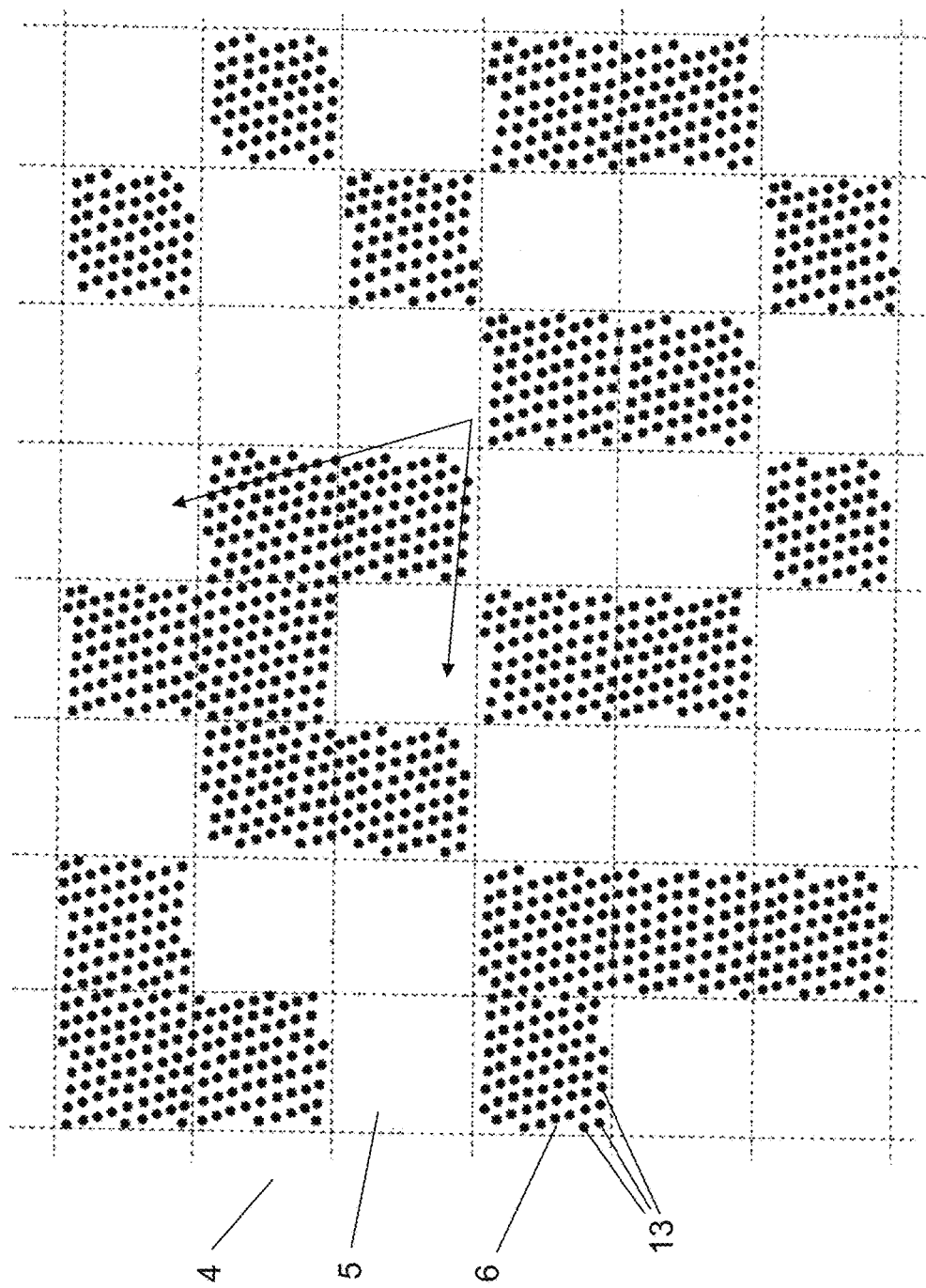

DISPLAY SCREEN AND METHOD FOR SECURE REPRESENTATION OF INFORMATION

RELATED APPLICATIONS

The present application is a National Phase entry of PCT Application No. PCT/EP2014/056804, filed Apr. 4, 2014, which claims priority from DE Patent Application No. 10 2013 007 948.9, filed Apr. 30, 2013, said applications being hereby incorporated by reference herein in their entirety.

FIELD OF THE INVENTION

The invention relates to a display screen comprising a background raster with a first type of light-radiating background raster elements and a second type of light-radiating or light-blocking background raster elements, with the light radiated by the second type of background raster elements differing in at least one property from the light radiated by the first type of background raster elements, and a foreground raster with completely light-transmissive and light-attenuating foreground raster elements. The foreground raster is arranged in front of the background raster as seen from the direction of a viewer, at a specified distance from the background raster, and, in particular, oriented in a specified lateral position normal to the distance from the background raster. If the plane normal to this distance is referred to as x-y plane, the orientation is prevalent in both the x and the y direction. Provided that the second type of background raster elements also radiate light and that they are not light-blocking, one can use, e.g., the color or the brightness, or also the polarization as a property by which the light radiated by the first and the second type of background raster elements differs. Also, several properties may be different simultaneously.

The invention also relates to a method for the secure presentation of information on such a display screen, in which light is radiated by a background raster with a first type of light-radiating and a second type of light-radiating or light-blocking background raster elements. The light then hits a foreground raster with completely light-transmissive and with light-attenuating foreground raster elements, the foreground raster being located in front of the background raster, as seen in viewing direction, arranged at a specified distance from the background raster and oriented in a specified lateral position normal to the distance from the background raster.

The term "light-radiating" with reference to the background raster elements is understood to denote such elements that are self-luminous, but also such that reflect or transmit the light. Eligible devices include LC display screens, display screens assembled of organic LEDs (OLEDs), printed image contents, transmissive, i.e., translucent image contents, field emission displays (FEDs), surface-conduction electron-emitter displays (SEDs), and vacuum fluorescent displays (VFDs), to name but a few examples. Instead of a display with, as a rule, active illumination, one can also use, e.g., rasters printed onto a transparent sheet, in which case the material used for the background raster may also be non-transparent if ambient light is used for illumination. Preferably, the display screens are flat. Light-blocking background raster elements may be, e.g., dots printed in any color; a light-radiating background raster element is, as a rule, a pixel or subpixel of a flat screen of one of the types mentioned above. The completely light-transparent foreground raster elements transmit the light coming from the back almost without any hindrance, i.e. they are completely transparent for the wavelengths used, apart from some light attenuation of up to 10% or—depending on the material—somewhat higher, due to dispersion or absorption by material impurities. In case of greater attenuation up to complete non-transparency, the foreground raster element is referred to as light-attenuating. The attenuation may be caused, e.g., by dispersion, i.e. non-directional deflection, or by absorption, but also by directed deflection such as reflection or diffraction. The foreground raster elements may also be color-selective, i.e., transparent for a small wavelength range each.

In recent years the designers of liquid-crystal displays (LCDs) have essentially concentrated their efforts on increasing the viewing angle so that viewers from the greatest possible range of viewing angles might perceive the image in a quality possibly just as good as when looking at it directly from a direct front position, these efforts having resulted in significant progress, especially with regard to TV and computer screens; frequently, however, there are situations in which a very large viewing angle range is a disadvantage, e.g. when PINS have to be entered into the display screens of automated teller machines. More and more, applications for mobile devices such as tablet PCs, mobile phones or notebooks become available by means of which bank transactions can be performed or other personal particulars or sensitive data be displayed. For the users of such devices it is important that the viewing angle is limited, e.g., in order to prevent any other person situated within the viewing angle range from seeing such sensitive data. On the other hand, in many other applications one would rather have a viewing angle as large as possible, e.g., where moving or still imagery is to be viewed. It is desirable, however, to use the same display for all of these applications, whether sensitive or less sensitive, not least to save cost. Even in case of automated teller machines or of PIN input devices at the checkout counters of stores and supermarkets, the viewing angle need not be limited all the time to the user standing directly in front of it; rather, during intervals in which the device is not used, the screen can be used to display other information or advertisements to be seen by the greatest possible number of customers.

From that point of view, then, it is desirable to use one and same display for sensitive processes that call for a narrow viewing angle range as wel as less sensitive applications in which a viewing angle range as wide as possible is desired, not least to reduce cost to the owners of such devices.

DESCRIPTION OF PRIOR ART

In prior art, various approaches toward this aim are known, which suffer from several disadvantages though.

Accessory sheets based on micro-louvers have long been known. They have already been used for small, mobile display screens to improve optical data protection. However, such foils cannot be switched over from a narrow and a wide viewing angle range; rather, they have to be applied and removed manually. Also, the films have to be carried separately from the display as long as they are not required for the respective application.

U.S. Pat. No. 6,765,550 describes an improved privacy filter device on the basis of micro-louvers. Here, the micro-louvers are switchable. As a disadvantage, however, handling the filter involves its mechanical, i.e., manual attachment and removal. Moreover, light loss in the protected mode is very high, so that this privacy filter can hardly be used in high-brightness environments.

U.S. Pat. No. 5,993,940 describes the use of a plastic film provided with small prismatic ridges evenly spaced on its surface to provide a protected mode. Manufacturing such films, though, involves complex technology and therefore is costly.

U.S. Pat. No. 6,2111,930 describes the use of a second LC display with privacy protection for automatic teller machines. The rear illumination (backlight) is collimated in such a way that light can pass this arrangement only if an interposed diffusor is switched off. Here again, the technical complexity and costs involved are high.

In WO 2012/033583, switching between free and restricted viewing is effected by means of liquid crystals arranged between so-called "chromonic" layers. As in the film filters described above, the light loss is excessive, and technical implementation is rather expensive.

WO 2009/050505 describes a mask structure that permanently blocks light in a pattern, with switching between a public and a private mode being performed via the use of different pixel groups for the two modes. However, the brightness compared to a display screen not covered with a mask structure is greatly reduced, together with a loss in resolution in the public mode.

JP 2005-134678 describes a display in which switching between a public and a private mode is effected by triggering liquid crystals. This solution is expensive, though; in addition it causes a great loss in brightness, as in the approaches described above.

U.S. Pat. No. 7,675,568 discloses switching between a wide and a narrow viewing angle range by means of a non-static and, as a rule, periodic barrier, the display being triggered accordingly with image contents. Compared to a display screen without such a barrier, the brightness is reduced, and so is the resolution in the wide viewing angle mode.

Finally, WO 2013/049088 describes switching between such modes on the basis of using a material the dispersive properties of which can be controlled, so that switching between a dispersive and a non-dispersive state can be effected. The material is located in structured channels. This approach, however, is rather complicated technically, and it also reduces the brightness of the display screen.

With the methods and arrangements known in prior art, the provision of a capability to switch between a private, protected mode with a very narrow viewing angle range and a public, unprotected mode with a wide viewing angle range as a rule leads to a serious decrease in the brightness of the basic display screen and/or the resolution in the unprotected mode. In addition, manufacture is, in most cases, technically complicated and, thus, expensive; in some cases an additional active optical element is needed for switching between the two modes, which further increases costs.

DESCRIPTION OF THE INVENTION

Therefore, the problem underlying the invention is to design a display screen and a method for the secure presentation of information, with the arrangement and the method intended to be implementable with simple means and at affordable cost, and with the added aim to enable, advantageously, partial or complete switching between the secure operating mode and an unprotected operating mode, with the highest possible resolution in the unprotected mode, and the least possible reduction in brightness.

For a display screen of the type described at the beginning, this problem is solved in such a way that, in at least one foreground field of the foreground raster, the completely light-transmissive and the light-attenuating foreground raster elements are stochastically distributed at a ratio of about 50:50. This distribution serves as a key for encoding the background raster. For the background raster, a basic encoding is defined as an inverted distribution of the light-transmissive and light-attenuating foreground raster elements in at least one background field corresponding to the foreground field, so that light-attenuating foreground raster elements correspond to the first type of light-radiating background raster elements, and completely light-transmissive foreground raster elements correspond to the second type of light-radiating or light-blocking background raster elements. In at least one selected region, which defines some information, the distribution, in the at least one background field, of the second type of light-radiating or light-blocking and of the first type of light-radiating background raster elements is at least partially inverted relative to the basic encoding, as an encoding of the information. The lateral dimensions of the foreground raster elements, the distance and the lateral position of the foreground raster relative to the background raster are matched in such a way that a viewer looking at the foreground raster will, due to a difference in contrast and/or color from such fields of the background raster that are basically encoded, discern the encoded information as encoded only from one viewing direction or a viewing angle ranging from a few degrees up to approximately ±50 degrees about the viewing direction. Overall, there results a maximum viewing angle range of about 100°. With this range, even such viewing positions can be allowed for in which the viewer looks at the display surface from a distance of a few centimeters only.

In this connection, the first type of light-radiating, or the second type of light-radiating or light-blocking background raster elements, respectively, are, in general, self-luminous, reflecting, transmitting or other pixels or subpixels of an LC display, of OLEDs, of printed image contents, of transmissive image contents, of SED or VFD displays, to name but a few examples of flat-screen displays. An light-blocking background raster element may also be a dot printed on a film in any color that is light-blocking to the light of the wavelength used.

A light-radiating background raster element of the first or second type may be active, i.e. radiating light itself, or passive, i.e. radiate light in the sense of being transmissive so that light coming from behind is passed to and radiated from the front rather than being absorbed. The completely light-transmissive elements of the foreground raster transmit light unhindered to the greatest possible extent, i.e. they are not made to absorb light of the wavelengths used. Even then, nevertheless, dispersion and other interfering processes may lead to slight light attenuation, which is below 10% but cannot be totally excluded technically. The light-attenuating foreground raster elements absorb, scatter or deflect light to a higher degree.

The invention also relates to a method for the secure presentation of information on a display screen as described before and hereafter, in which a background raster with a first type of light-radiating and a second type of light-radiating or light-blocking background raster elements radiates light, this light hitting a foreground raster with completely light-transmissive and light-attenuating foreground raster elements, the said foreground raster being arranged at a specified distance from the background raster and oriented in a specified lateral position normal to the distance from the background raster.

Since many characteristics of the invention relate to the arrangement as well as to the method, the following explanations, as far as possible, are intended to apply to both, whereas individual aspects of the display screen and the method will be dealt with separately.

The basic concept of the invention is founded on the superimposition of two raster images. One of the two raster images, namely, the one displayed in the foreground on the foreground raster elements—which is not an image in the common sense of the word, in which a viewer looking at the "image" recognizes an image content, but merely an accumulation of light-transmissive and light-blocking or light-attenuating and/or light-deflecting raster elements, which per se do not yield any information—is a pattern that remains static at least for a certain time, whereas the contents presentable on the background may be varied, unless the background raster is a static raster in the sense of a printed film or the like.

The basic encoding can be performed either based on the foreground raster or also on the background raster. It is not necessary in this process to use the entire raster; it is sufficient to use a segment or field of the background raster and, correspondingly, a field of the foreground raster, whereas the remaining fields of the foreground and background rasters remain uncoded.

The simplest way to define a basic encoding of the background raster is to distribute, in at least one such background field of the background raster, the light-radiating background raster elements of the first type and the light-radiating or light-blocking background raster elements of the second type stochastically at a ratio of about 50:50; this distribution then forms the basic encoding of the background raster. It is essential that the modulation is effected in such a way that the ratio of light-blocking or light-radiating background raster elements of the second type to the light-radiating background raster elements of the first type is approximately 1:1, with deviations up to 5% being tolerable. Greater deviations will, in the end, cause the secure presentation to be impaired. Preferably, the individual light-blocking or light-radiating background raster elements of the first type, or the individual light-radiating background raster elements of the second type, respectively, are of equal size. A viewer looking at the "image" from some distance will perceive a uniformly colored field. Mostly this is gray if the raster elements are, e.g., monochrome subpixels, but may also be monochrome in one of the primary colors or any other color, depending on the design of the display screen.

This basic encoding of the at least one background field is then used to define a key in at least one foreground field of the foreground raster corresponding to the at least one background field, which key corresponds to the inverted distribution of the light-radiating background raster elements of the first type and to the light-radiating or light-blocking background raster elements of the second type, so that light-attenuating foreground raster elements correspond to light-radiating background raster elements of the first type, and completely light-transmissive foreground raster elements correspond to light-radiating or light-blocking background raster elements of the second type.

It is also possible to first define the key, i.e. the stochastic distribution of the light-transmissive and the light-attenuating foreground raster elements of the foreground raster, from the inversion of which the basic encoding of the background raster is then established. For presenting the information, the background raster is used. This, therefore, is preferably be designed as a first LC panel; the background raster elements preferably are full-color or monochrome pixels or subpixels of a color of the first LC panel. By means of a control unit, the background raster elements can be controlled to vary their transparency and/or color. In this way, different bits of information can be presented successively with the same encoding.

A piece of information corresponds to one or several selected fields in the at least one background field or in several background fields. This at least one field, which has at least the size of one background raster element but, as a rule, is a contiguous field of several background raster elements, defines the information, for example, by its outer contour, which may correspond, e.g., to a digit or a letter. The piece of information is coded in such a manner that the distribution of the light-radiating background raster elements of the first type and of the light-radiating or light-blocking background raster elements of the second type in this field is inverted at least partially as opposed to the basic encoding. The inverted part of the background raster elements shows the same behavior as the corresponding foreground raster elements arranged in front of them; this means that light-radiating or light-blocking background raster elements of the second type correspond to the at least light-attenuating and/or -deflecting foreground raster elements, and light-radiating background raster elements of the first type correspond to completely light-transmissive foreground raster elements. Thanks to this inversion and because of the mutual orientation and matching of the rasters and their elements, this selected field that defines the information seems, within a narrow viewing angle range of preferably less than ±30°—i.e. covering a total range of 60°—but more preferably less than ±15° about the viewing direction, brighter than the surrounding non-selected field or fields, where the screen appears dark or almost black or in some other monochrome color. This is made possible because the lateral dimensions of the foreground raster elements, the distance and the lateral position of the foreground raster relative to the background raster are matched in such a way that a viewer looking at the foreground raster will, due to a difference in contrast and/or color compared to such fields of the background raster having basic encoding, discern the coded information only from one viewing direction or in a viewing angle range of a few degrees about his/her own position. If, in the field carrying the information, the distribution of the light-radiating background raster elements of the first type and of the light-blocking or light-radiating background raster elements of the second type is completely inverted, the difference in contrast is greatest. However, partial inversion is sufficient if, e.g., contrast differences are to be kept at a moderate level. From the side, i.e. from outside the viewing angle cone, the field carrying the information is perceived only as an indiscriminate, gray or monochrome field that does not differ in color from the fields not selected.

As the information is presented on selected fields of the background raster, it is possible, and with low cost at that, to design the foreground raster as a static one, preferably as an exposed or developed film or as cured polymer. The foreground raster can be prepared, e.g., directly with the aid of the background raster by suitable exposure. Alternately, it is also possible to define a mask structure for providing the key for the foreground raster by means of a photographic mask and then to transfer the mask structure correspondingly to the background raster for producing the basic encoding. In the manufacture of display screens, the basic encoding may vary between two display screens in order to achieve the highest possible security. In this way, a great number of display screens can be manufactured whose basic encodings differ from each other. If the foreground raster is designed as a static one, it is preferably attached to a transparent foreground substrate for stabilization. To keep the design as compact as possible, it is of advantage if the foreground substrate is constituted by a cover glass of the first LC panel, which forms the background raster, so that, in the end, both rasters are attached to one carrier substrate.

In another embodiment, the foreground raster is not static but configured as a second LC panel or as a transparent OLED display (organic light emitting diode display). Here again, as in the background raster, the foreground raster elements are full-color or monochrome pixels or subpixels of a color of the second LC panel. If the second LC panel is also connected with a control unit for triggering the foreground raster elements to change their transparency and/or colors, it is possible to change the basic encoding and the key from time to time in order to further increase security. Basic encoding and key can, for example, be redefined before every operation in which, in the at least one field defining a piece of information, the distribution of light-transmissive and light-blocking background raster elements is at least partially inverted, or redefined at specified or randomly chosen intervals. Generally it is possible in this configuration to use either of the two LC panels as a foreground or background raster irrespective of their front or rear position, and it can be of advantage, at that, to alternate their action as foreground or background raster with time.

It is expedient if this at least one field in the background region can be variably selected by means of a control unit, so that such a field becomes visible, e.g., as a digit or letter, to the viewer within the corresponding viewing angle range. To further increase security, i.e. to still better hide the information to be protected, subfields are stochastically defined in the at least one field in the at least one background region, with inversion taking place in the subfields only. By the suitable selection of the size and distance of the small field shares within the field, the resulting contrast ratio for the visualized information can be controlled.

It is particularly advantageous if uncoded information visible from various viewing angles or within a large viewing angle range are presented in fields of the raster that lie outside the at least one background field and outside the at least one foreground field. For example, the encoded information may represent a PIN input device comprising a touch-sensitive display screen for entering the PIN. The uncoded, freely visible information may then be supplementary information, such as the current time, instructions about items to be entered, or definitions of other control buttons.

In a particularly preferred embodiment of the invention, the display screen comprises means for creating a relative movement between foreground raster and background raster, or between the image contents presented on at least one of these rasters. This can be implemented by means of the control unit mentioned before; the means for creating a relative movement between the two rasters may comprise, e.g., a controllable axial servo motor for varying the distance between background raster and foreground raster. Preferably, the means for creating the relative movement comprise, supplementarily or alternatively, one or two controllable lateral servo motors for the displacement of the foreground raster relative to the background raster in a lateral plane parallel to the planes in which lie the foreground raster and the background raster. Preferably, the lateral servo motors are, via a control system, coupled with a tracking system, which registers the viewing direction of the viewer. According to the invented method, this registration of the viewer's viewing direction is effected via a determination of the position of the viewer's eyes, which is captured and monitored. In case of a change in the position of the eyes, the foreground and background rasters are laterally shifted relative to each other, whereby the viewing direction is made to follow the position of the eyes. In such a case, the encoded information is essentially visible in a decoded state only from the actual viewing direction of the viewer or user to whose eyes the system responds, or within a viewing angle range about the viewer's viewing direction. In this way it can be ensured, e.g. with an automated teller machine, that it is only the user who can always see the encoded information in a non-encoded state such as, say, with a PIN input device, even if he/she moves his/her head, and that nobody else can discern the PIN input field. Moreover, it is also possible, by pixelwise or subpixelwise displacement of the image contents of the background raster, to make the visible field of the viewing direction follow the position of the eyes, without the need to move one of the two rasters. The viewer's viewing direction is captured, e.g., by a technology such as used for tracking and which registers and monitors the position of the eyes. For the actual tracking, though, preferably one would not physically displace the rasters relative to one another, but rather shift the at least one selected field in the at least one background field, either pixelwise or subpixelwise.

The viewing angle range should preferably be restricted to an angle the diameter of which in the range of the viewer's eyes is only slightly greater than the spacing of the eyes. By an axial adjustment of the distance between background raster and foreground raster, it is further possible to adapt the display screen, or the presentation of protected information to the distance of the viewer from the display screen, because, e.g., with a short or very short distance between the eyes and the display screen, a greater viewing angle range is needed than with a longer distance. This information, too, can be determined by means of suitable measuring devices in combination with cameras, and integrated in the control system.

In the background raster, which is preferably an LC panel or a transparent or non-transparent OLED display, the arrangement of the light-radiating background raster elements of the first type and of the light-radiating or light-blocking background raster elements of the second type is done stochastically in the manner of a digital frequency modulation, i.e. the positions of the light-blocking or light-radiating background raster elements of the second type, or of the light-radiating background raster elements of the first type, respectively, are arranged in the raster stochastically, with all raster elements having the same size, however. This is a stochastic, digital frequency modulation (FM), which is also known as delay code or Miller code. This digital modulation or line coding supplies a discrete-time, digital bit sequence, if, e.g., light-radiating or light-blocking background raster elements of the second type correspond to the value "zero", and light-radiating background raster elements of the first type to the value "one", or vice versa.

If the foreground raster is also an LC panel, this is, accordingly, also digitally frequency-modulated, though with the inverted presentation. It is true that with such a display screen it is optionally possible to present also two-dimensional white-and-colored contents, which are impaired, though, under the interfering impression of the foreground raster elements still visible because they are light-attenuating or monochrome and aligned in columns. At the same time, these also reduce the brightness of the presentation. In order to be able to present white-and-colored contents free of artefacts, it is particularly advantageous to assemble each individual foreground raster element from a great number of subraster elements of various sizes and/or forms, regularly arranged in a subraster, to implement which is easiest, as a rule, in static, passive filters, which can be produced photographically, for example. As the individual subraster elements are varied in size and/or form, the subraster is not a digitally frequency-modulated pattern, but an amplitude-modulated raster (AM raster). The subraster elements attenuate light transmission, e.g., by diffraction, refraction, partial absorption, reflection or dispersion, especially if they are made from cured polymers, which preferably make up the optical structure of this subraster, or if, more generally, the foreground raster is a static one. As a rule, it is both necessary and sufficient if the light-attenuating foreground raster elements are assembled from subraster elements, whereas the light-transmissive foreground raster elements need not be assembled from such subraster elements, although they can, provided that this produces perceivable brightness and/or color differences from the light-attenuating foreground raster elements. Generally, the subraster elements should be distinctly smaller than the foreground raster elements, at least by a factor of approximately 4 or 5.

This amplitude-modulated subraster is superimposed on the foreground raster, which in its basic structure is digitally frequency-modulated and defines the basic size of the individual foreground raster elements, so that each light-attenuating—which is understood also to include light-deflecting—foreground raster element consists of a great number of subraster elements. Preferably, the grid underlying the background raster and the foreground raster is not identical with the the grid underlying the subraster. For example, the raster structures underlying the the background and the foreground raster each generate, as a rule, a grid with two mutually perpendicular grid axes, as this is the predominant raster structure of LC panels. For the grid structure of the subraster, however, there is greater freedom, because this is produced, e.g., by means of a photographic mask and/or by curing a polymer. Thus, a subraster structure underlying the subraster can, as a preferable alternative, generate an affine grid, with the angle between the two axes generating the affine grid deviating from 90° and preferably being 60°. In this way one can avoid the grids of the foreground and the background raster on the one hand and the grid of the subraster on the other hand having common grid axes. This substantially contributes to the reduction of artefacts: line and angle moiré phenomena, which might interfere with the superimposition image produced by the background and foreground rasters, are avoided. In fact, the assembly of the foreground raster elements from the substantially smaller amplitude-modulated raster elements every time results in randomly different, irregular edges of the digitally frequency-modulated foreground raster elements.

Preferably, the subraster elements are of approximately circular shape, with deviations from that shape due to manufacturing being not only possible but also desirable for the avoidance of artefacts. Therefore, the subraster elements may also be of irregularly rectangular or triangular shape, have a polygonal or even irregular outline. With particular preference, the subraster elements are approximately circular in shape, but with an irregular outline. In that case, the subraster elements can be assigned a mean diameter, which is preferably 6 μm, but may also be greater or smaller, depending on the application. Whereas the mean diameter of the total number of subraster elements is 6 μm, the diameters of the separate subraster elements are distributed about this mean diameter of 6 μm according to a Gaussian distribution with a full width at half maximum of 1 μm. However, the full width at half maximum may be greater or smaller, e.g., lying between 0.5 μm and 3 μm. The mean diameter of the subraster elements may also lie between 5 and 7 μm. The grid pitch of the subraster elements, i.e. the distance between two subraster elements from each other along one of the grid axes is preferably between 13 μm and 15 μm in each of the two affine directions, but these values, too, may vary to suit the application. If, in addition, neither of the two grid axes of the affine grid coincides with one of the two perpendicular grid axes of the foreground raster or the background raster, this is particularly efficient for avoiding artefacts.

It is to be understood that the features mentioned before and explained below are applicable not only in the combinations stated but also in other combinations or as stand-alone features without leaving the scope of the present invention.

BRIEF DESCRIPTION OF THE DRAWINGS

Below, the invention will be explained in more detail and exemplified with reference to the accompanying drawings, which also show features essential to the invention, among others, and in which FIG. 1 a-c shows an example of a basic encoding and a key, and their interaction, FIG. 2 a-c illustrates the principle of presenting information on a display screen, FIG. 3 a-c shows a variation of the principle shown in FIG. 2, FIG. 4 a-b shows the principle structure of a first display screen, FIG. 5 a-b shows the principle structure of a second display screen, FIG. 9 shows a foreground raster with a subraster.

DETAILED DESCRIPTION OF THE DRAWINGS

Described below is a display screen that is suitable for security-relevant applications, because the sensible information to be displayed can be seen in decoded form only from a viewing angle range of up to ±50° about a viewing direction, outside of which the information appears encoded, i.e. unidentifiable. The display screen is based on the superimposition of two raster images, with "image" in this context meaning that information is presented there which, however, need not be immediately accessible to the human brain, i.e. may be encoded.

Figure 1A:
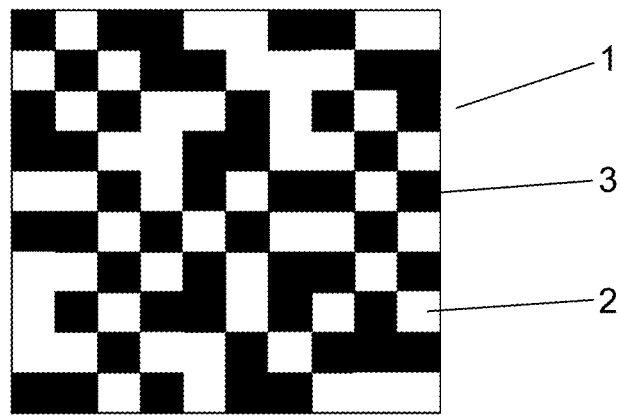

Such a display screen first comprises a background raster 1 as exemplified in FIG. 1a. This background raster 1 comprises light-radiating background raster elements of a first type and light-radiating or light-blocking background raster elements of a second type. The white squares correspond to light-radiating background raster elements of the first type 2, and the black squares correspond to light-radiating or light-blocking background raster elements of the second type 3, which here, for easier understanding, are designed as light-blocking, i.e. non-light-radiating background raster elements. In at least one background field of the background raster 1—which here corresponds to the entire raster shown, but is, as a rule, part of a larger display screen—, the light-radiating background raster elements of the first type 2 and the background raster elements of the second type 3, here designed as light-blocking background raster elements, are stochastically distributed at a ratio of approximately 50:50, which means that, on average, the at least one background field comprises just as many light-radiating background raster elements of the first type 2 as light-radiating or light-blocking background raster elements of the second type 3, with deviations of up to 5% being within tolerance without essentially impairing the encoding intended. This stochastic distribution is defined as basic encoding of the background raster 1.

The light-radiating background raster elements 2 need not be designed to be actively light-radiating but may also be designed to be passively light-radiating, i.e., for example, they may be transmissive to light coming from a source, e.g. of extended field, that illuminates the background raster elements 2, 3 from behind. The background raster 1 may be an LC panel, for example. The distribution of the background raster elements need not absolutely be static, but may be varied, so that a light-radiating background raster element of the first type 2 can be switched to become a light-radiating or light-blocking background raster element of the second type 3, and vice versa. A static distribution is possible if the information to be displayed is always the same.

Figure 1B:
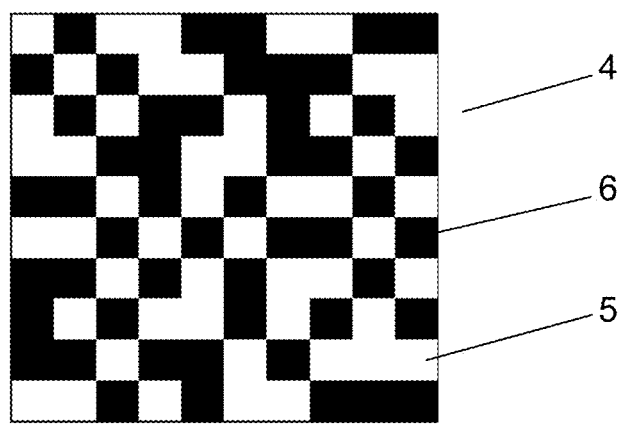

Arranged in front of the background raster 1 as seen by a viewer is a foreground raster 4, which is exemplified in FIG. 1b. This comprises completely light-transmissive foreground raster elements 5 and light-attenuating foreground raster elements 6. Here, the light-attenuating foreground raster elements 6 are drawn black, i.e. light-blocking, which is not absolutely necessary but will deliver the best contrast. A light attenuation of, e.g., only 50% compared to the original brightness perceived by a viewer is a feasible configuration, too. That light attenuation can be achieved, e.g., by dispersion, diffraction, deflection of other kinds, or partial absorption. The completely light-transmissive foreground raster elements 5 also absorb or scatter the light to a very small extent, e.g., due to lattice defects or impurities in the transparent material used for the foreground raster elements. This unintended but unavoidable light attenuation has natural causes and will impair light transmission but negligibly.

The foreground raster 4 is arranged at a specified distance from the background raster 1 and in a specified lateral position normal to the distance from the background raster 1. In the foreground raster 4, at least one foreground field that corresponds to the background field has a key defined as inverted distribution of the light-radiating background raster elements 2 and of the light-blocking background raster elements 3, so that light-attenuating foreground raster elements 6 correspond to light-radiating background raster elements 2, and completely light-transmissive foreground raster elements 5 correspond to light-blocking background raster elements 3.

Figure 1C:
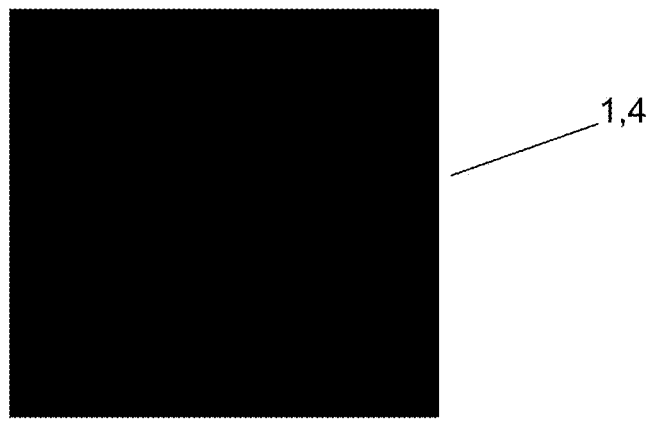

As an alternative, it is also possible to first define in the at least one foreground field a stochastic distribution at a ratio of 50:50 between the completely light-transmissive foreground raster elements 5 and the light-attenuating foreground raster elements 6, and then use this distribution as a key for encoding the background raster. Both procedures are equivalent, since, as a result in either case, the distribution of the raster elements in the background raster 1 is inverted relative to that in the foreground raster 4, so that a superimposition of the two rasters will supply the image shown in FIG. 1c. An additive superimposition thus will lead to a uniformly black, monochrome or gray field throughout, depending on the configuration of the raster elements, e.g., statically or as pixels or subpixels of a colored or monochrome display screen.

For creating the stochastic distribution of the foreground raster elements or background raster elements, it is important to prevent the microstatistical formation of clusters of light-transmissive or light-attenuating or light-blocking raster elements, as this would diminish the encoding effect. One should further avoid a completely regular distribution of the light-blocking and the light-transmissive raster elements.

A viewer looking either only at the background raster 1 or only at the foreground raster 4 will in either case only see an irregular pattern without recognizable structures. With both pattern superimposed, however, the viewer will see, due to the parallel alignment of the two rasters and the matching dimensions of their raster elements, a homogeneously black or dark-colored field within the viewing angle range and a still irregular pattern outside this range.

Figure 2A:
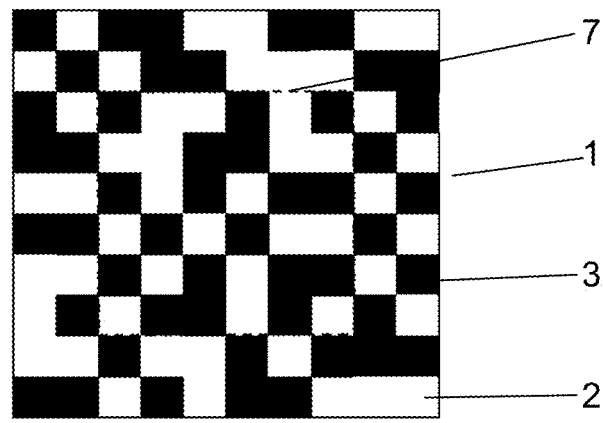
Figure 2B:
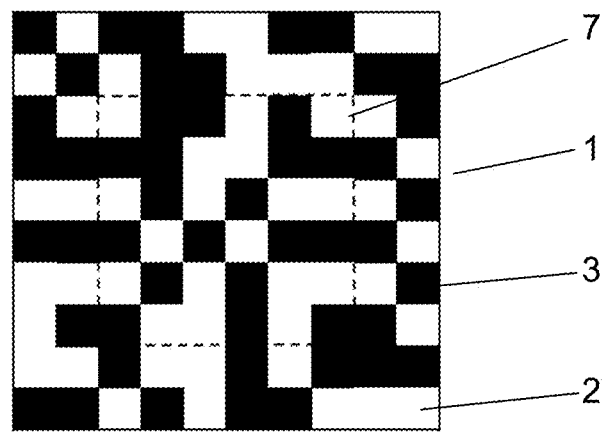
Figure 2C:
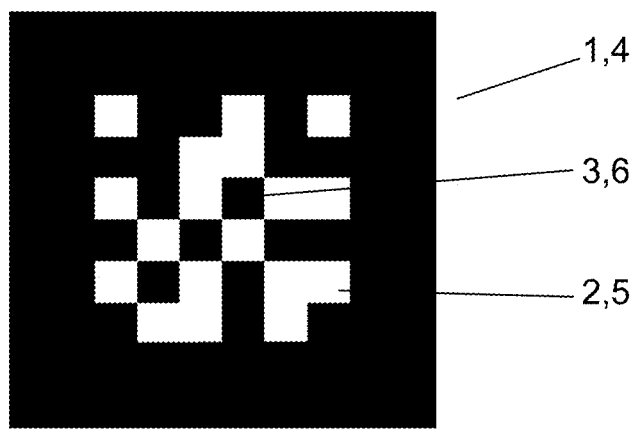

This superimposition effect is utilized to implement digits, letters or symbols in the background raster in such a way that they are, first, invisible to the eye. This is achieved in such a way that the inverted presentation is restricted to particular, closely bounded partial fields in the background raster 1 that are intended to carry this information. Let this be explained by means of an example illustrated in FIG. 2. To start with, FIG. 2a again shows the background raster 1 as seen in FIG. 1. As already explained, the background field here represents the background raster 1 shown. Now, to present information, one selects, in the at least one background field, a field 7 which defines the information. In FIG. 2a-2c, this field is outlined by broken lines and here, for illustration, forms a square. In reality, however, such fields 7 have the outlines of digits, letters or symbols; the information, then, is the respective digit, letter or symbol, i.e. the contours of the selected field define the information to be presented. Usually, the background raster 1 comprises several such fields 7, which preferably may also vary in time, depending on the information to be presented. In this at least one selected field 7 representing the information, this information is encoded now, in such a way that the distribution of the light-radiating background raster elements of the first type 2 and of the light-radiating or light-blocking background raster elements of the second type 3 is at least partially inverted there, relative to the basic encoding. In other words, encoding the information consists in a complete or partial inversion of the distribution of the background raster elements relative to the basic encoding. This state is shown in FIG. 2b. Here, the distribution of the light-radiating background raster elements of the first type 2 and of the light-radiating or light-blocking background raster elements of the second type 3 is inverted in the selected field 7 of the background raster 1, whereas it is not inverted in the outside field which is not selected.

Consequently, the superimposition of the foreground raster shown in FIG. 1b, which remains unchanged, and the background raster 1 shown in FIG. 2b, in which information is encoded in a selected field 7, leads to the result shown in FIG. 2c. In the fields not selected, the superimposition of foreground raster 4 and background raster 1 leads to complete blackening or homogeneous coloring, as already explained in connection with FIG. 1c. For the selected field 7, however, the distribution of the light-radiating background raster elements of the first type 2 and der light-radiating or light-blocking background raster elements of the second type 3 corresponds to the distribution of the completely light-transmissive foreground raster elements 5 and der light-attenuating foreground raster elements 6. Therefore, in front of a light-radiating background raster element of the first type 2 (in a viewer's viewing direction) there is arranged a completely light-transmissive foreground raster element 5. This applies analogously to the light-radiating or light-blocking background raster elements of the second type 3 and the light-attenuating foreground raster elements 6. Here, thus, the additive superimposition of the two rasters continues to yield the stochastic distribution of the raster elements, which leads to a blackening or coloring of 50% only, whereas outside the selected field the blackening or coloring is complete.

As a result, thus, there is a visible contrast between the at least one selected field 7 and the surroundings not selected—although not outside of the specified viewing angle range but only in the viewer's viewing direction. For this it is necessary that the lateral dimensions of the foreground raster elements 5 and 6, the distance and lateral position of the foreground raster 4 relative to the background raster 1 are matched to one another in such a way that a viewer looking at the foreground raster 4 sees the encoded information as decoded—as a contrast and/or color difference from such fields of the background raster 1 that merely feature the basic encoding—only from one viewing direction or a viewing angle in a range of a few degrees about the viewing direction. This viewing angle range, should, for example, be only slightly greater than the distance between the viewer's eys, depending on the distance from the display screen; preferably it extends about the viewing direction by less than ±30° or, with particular preference, less than ±15°. Outside of this viewing angle range, the foreground raster elements 5 and 6 and the background raster elements 2 and 3 are no longer in register, so that defined allocation gets lost, and a viewer outside of this viewing angle range sees a gray or homogeneously colored field only. To be able to read the encoded information, the viewer must needs be within the viewing angle range defined by the geometric arrangement.

On account of the stochastic distribution of light-blocking background elements 3 and light-radiating background raster elements 2 at a ratio of approximately 50:50, the information cannot be perceived by looking at the background raster alone, because even after inversion in the selected field 7, the light-blocking background raster elements 3 and the light-radiating background raster elements 2 remain distributed at the same ratio of about 50:50. Thus, one cannot see any difference from the surroundings, i.e. the fields not selected.

Figure 3A:
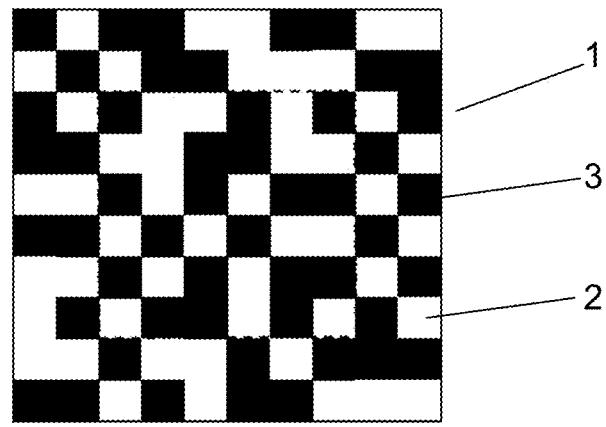
Figure 3B:
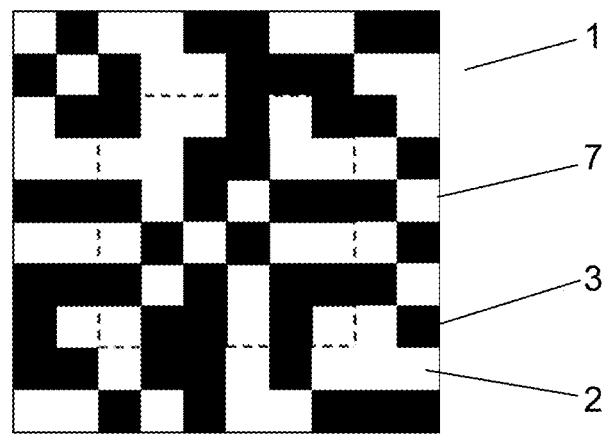
Figure 3C:
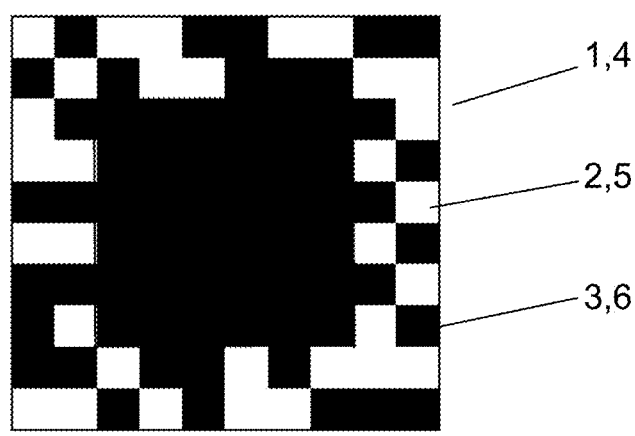

FIG. 3a-3c shows the same elements as FIG. 2a-2c, with the difference that, here, the selected field 7 is a marginal field, so that in the superimposition of background raster 1 and foreground raster 4, shown in FIG. 3c, the center is black or dark-colored.

To encode and present different pieces of information, one can variably select the at least one field 7 in the background region by means of a control unit. As an alternative, a contrast and/or color difference can be created in the reverse way, i.e. the basic encoding can be performed with foreground raster 4. The key is established by the distribution of the light-radiating background raster elements of the first type 2 and the light-radiating or light-blocking background raster elements of the second type 3. This embodiment can be regarded as an equivalent.

FIGS. 4a and 4b show the structure of a first exemplified display screen, which has the function of such a secure display screen, i.e. the information made visible by the additive superimposition of background raster 1 and foreground raster 4 can be seen only by a single person whose eyes—the viewing direction is indicated by the white arrrow from the right—are at least approximately normal to the display surface and directly in front of the center of this display screen. To achieve greater flexibility with regard to the viewer's position, such a display screen may further comprise means for creating a relative movement between foreground raster and background raster, for example, a controllable axial servo motor for varying the distance between background raster 1 and foreground raster 4, and two controllable lateral servo motors for the displacement of the foreground raster 4 relative to the background raster 1 in a lateral plane parallel to the planes in which lie the foreground raster 4 and the background raster 1. Preferably, the lateral servo motors and/or the axial servo motor are coupled with a tracking system which detects the viewer's viewing direction. This can be done by determining the position of the viewer's eyes, for which purpose this position is monitored. In case of a change in the position of the eyes, foreground raster 4 and background raster 1 are displaced laterally and/or axially relative to each other in such a way that the viewing direction thus displaced follows the position of the eyes.

FIGS. 4a and 4b show a segment of such a display screen, illustrating the principle of its structure. A light source 8 illuminates the background raster 1, which here has been attached to a background substrate 9. Arranged in front of the background raster 1 and at a specified distance from it there is the foreground raster 4, which has been attached to a foreground substrate 10. Here, the basic encoding is defined by the foreground raster 4; the information to be presented is also defined on the foreground raster 4 in fields 7 selected there, whereas the background raster 1 forms the key and is of a static nature. A viewer looks at the foreground substrate 10 from the right, as indicated by the bold arrow. In the viewing direction, the viewer only sees a blackened region, while the light radiated by the light source 8, in a straight direction toward the viewer, is blocked either already by the light-blocking background raster elements 3 or, at the latest, by the light-attenuating foreground raster elements 6, as indicated by the broken-line arrows. At an oblique angle, the light can pass, as indicated by the solid-line arrows; this viewing direction is, however, outside of the defined viewing angle range. The viewing angle range can be set by means of the distance between foreground raster 4 and background raster 1. The closer the two rasters are to each other, the greater is the viewing angle range.

FIG. 4b shows the situation that applies to a selected field 7 completely comprising the segment of the display screen shown here. The light is transmitted in the direction toward the viewer, i.e., in a straight direction, and because the distribution between light-blocking or light-attenuating raster elements and light-transmissive raster elements is 50:50, a 50% share of the light is transmitted, excepting other losses by reflection, diffraction, deflection or dispersion. In this case, the viewer positioned directly in front of the arrangement perceives the transmitted light, whereas viewing directions from the sides are blocked at least for the selected region. In regions not selected, the situation remains the same as shown FIG. 4a.

In the example shown in FIG. 4a-b, each of the two rasters is arranged on a substrate of its own, e.g., each on a transparent glass pane. The rasters may also be arranged on different sides of the respective substrates, i.e. the sides of background substrate 9 and foreground substrate 10 that face away from each other, but this will limit the capabilities of setting the distance.

In another embodiment shown in FIGS. 5a and 5b, a thin transparent raster substrate 11 carries the background raster 1 on one side and the foreground raster 4 on the other side. Otherwise, the structure is analogous to the display screen shown in FIG. 4. In this embodiment, though, the distance between foreground raster 4 and background raster 1 is fixed by the thickness of the substrate and cannot be freely adjusted.

Figure 6:
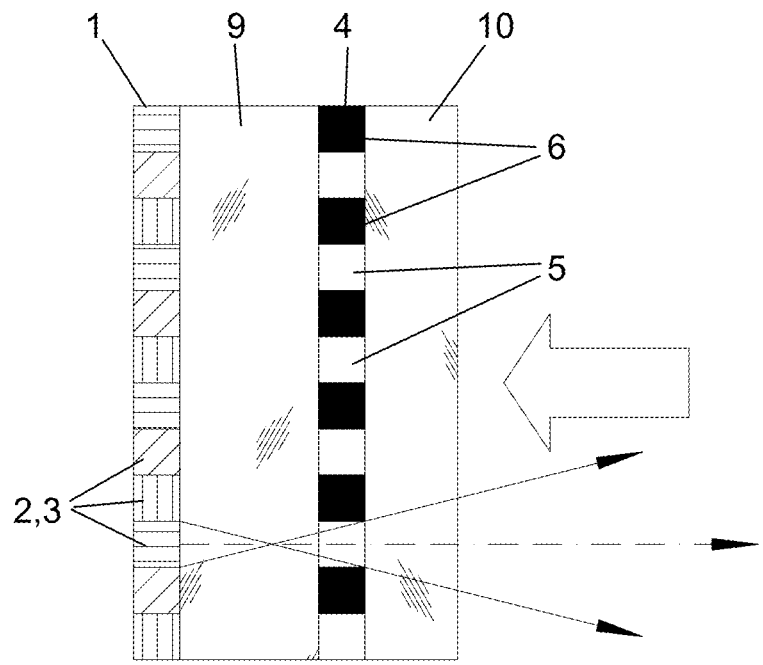
FIG. 6 shows the principle structure of a third display screen.

Another embodiment of a display screen is exemplified in FIG. 6. Here, the background raster 1 is designed as a first LC panel. The background raster elements 2 and 3 are either full-color or monochrome pixels or subpixels of a color of this first LC panel; different hatching patterns represent different colors. The background raster elements 2, 3 are connected with a control unit for triggering them, so that the transparency and/or the color of these elements can be changed. Thus, the status of each of the background raster elements can be changed from a light-radiating background raster element 2 into an light-blocking background raster element 3 and vive versa. In this case it suggests itself to use the background raster for the basic encoding and to design the foreground raster as a static one. The background raster 1 in FIG. 6 is attached to a background substrate 9, which may be, for example, the cover glass of the LC panel. The foreground raster 4 is attached to a foreground substrate 10 but at the same time connected with the background substrate 9 or placed in contact with it. The use of an LC panel as a background raster 1 offers the big advantage that different contents can be presented on it any time. As a foreground substrate 10, some transparent material such as glass or plastic—e.g., a PET sheet—can be used; it serves only for the fixation and protection of the foreground raster 4 and may be made very thin; its representation in the figures is not to scale. The foreground raster 4 may be designed, e.g., as an exposed and developed film or as a cured polymer. The lateral dimensions of background raster elements 2, 3 and foreground raster elements 5, 6 are of the same order of magnitude. In the case shown in FIG. 6, the foreground raster 4, while being arranged directly in front of the background substrate 9, can be displaced axially, i.e., along the viewing direction indicated by the large arrow. Here again it is possible, as an alternative, not to use the background substrate 9 but a raster substrate 11 instead, on which both the foreground raster 4 and the background raster 1 are applied. In this case, a foreground substrate 10 is not absolutely necessary (except for protection), because the foreground substrate 10 is formed by the cover glass of the LC panel, which doubles as a background substrate 9.

Figure 7:
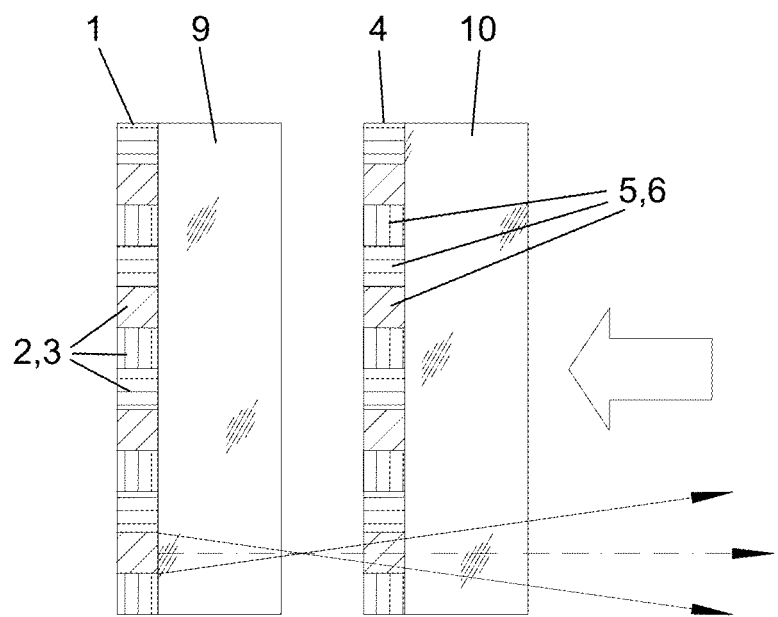
FIG. 7 shows the principle structure of a fourth display screen, FIG. 8 a-g shows the presentation of information with controlled contrast on a display screen.

Yet another embodiment is exemplified in FIG. 7. Here, the foreground raster 4 is designed as a second LC panel or as a transparent OLED display. Here again, the foreground raster elements 5, 6 are full-color or monochrome pixels or subpixels of a color of a second LC panel. The distance between the background substrate 9 and the foreground raster 4 can be varied. Preferably, the two LC panels are identical in design. This example offers the big advantage that the foreground raster 4 can be switchen on and off as required, by which one can enable, on the one hand, unhindered viewing of contents accessible to all, as well as, on the other hand, protected presentation of confidential information for a single viewer only. In this embodiment, the foreground raster elements 5, 6 can, comparable to the background raster elements, also be controlled by the control unit for changing their transparency and/or color; the control unit, while not shown here, can be implemented by means of customary processors. The reverse way is possible, too, i.e. to make the background raster elements static and the status of the foreground raster elements variable by control. If the control system is suitably designed, it will then be possible also to present, largely undisturbed, normal contents in the form of colored images or image sequences on such a display screen. Moreover, the use of a second LC panel further improves security, as it opens up the possibility to redefine, at least partially, the basic encoding and the key before every action in which the distribution of light-radiating background raster elements 2 and light-blocking background raster elements 3 is at least partially inverted in at least one field. Key and basic encoding can also be redefined at specified or randomly selected intervals, i.e. after a certain number of actions.

Figure 8A:
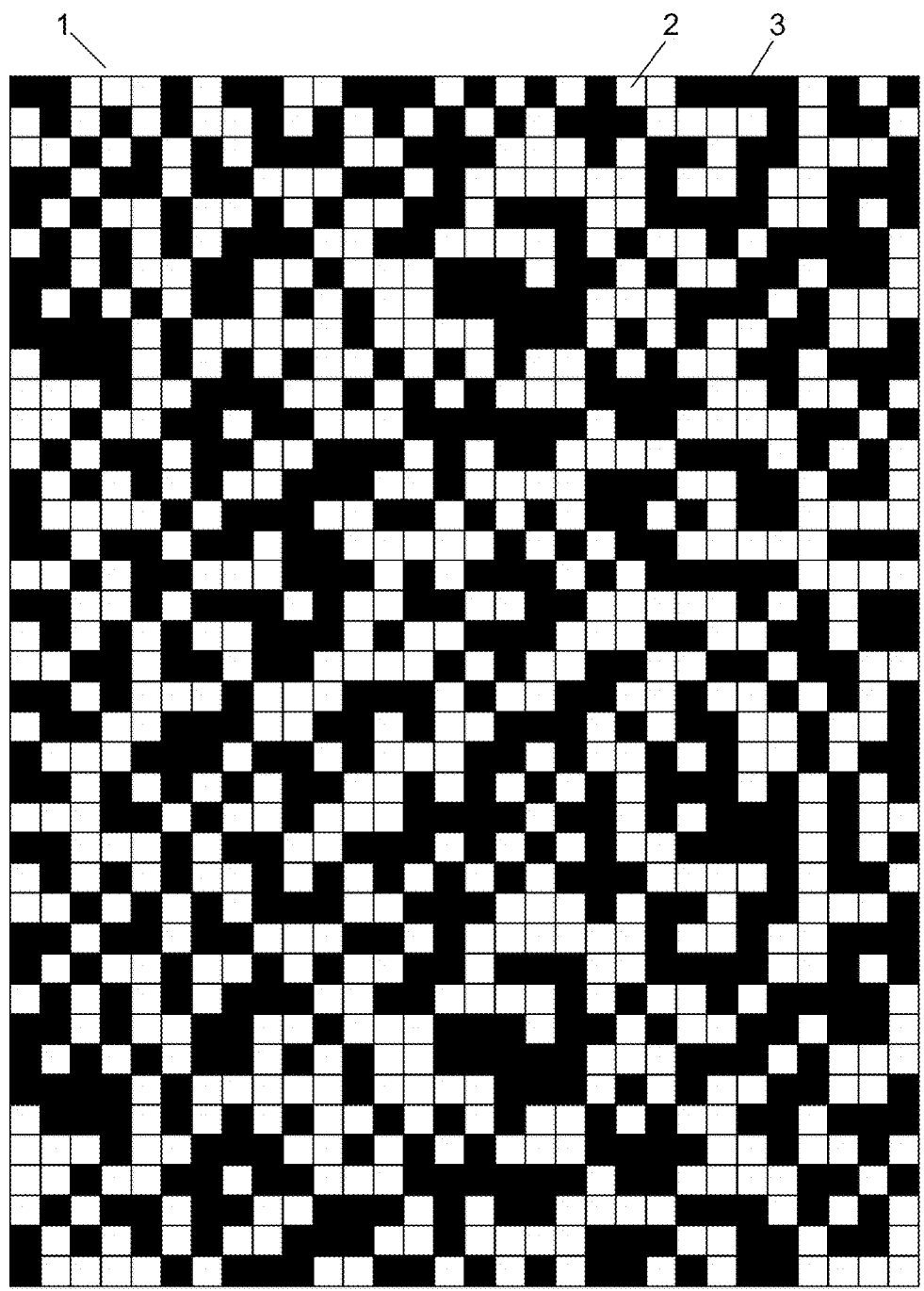
Figure 8B:
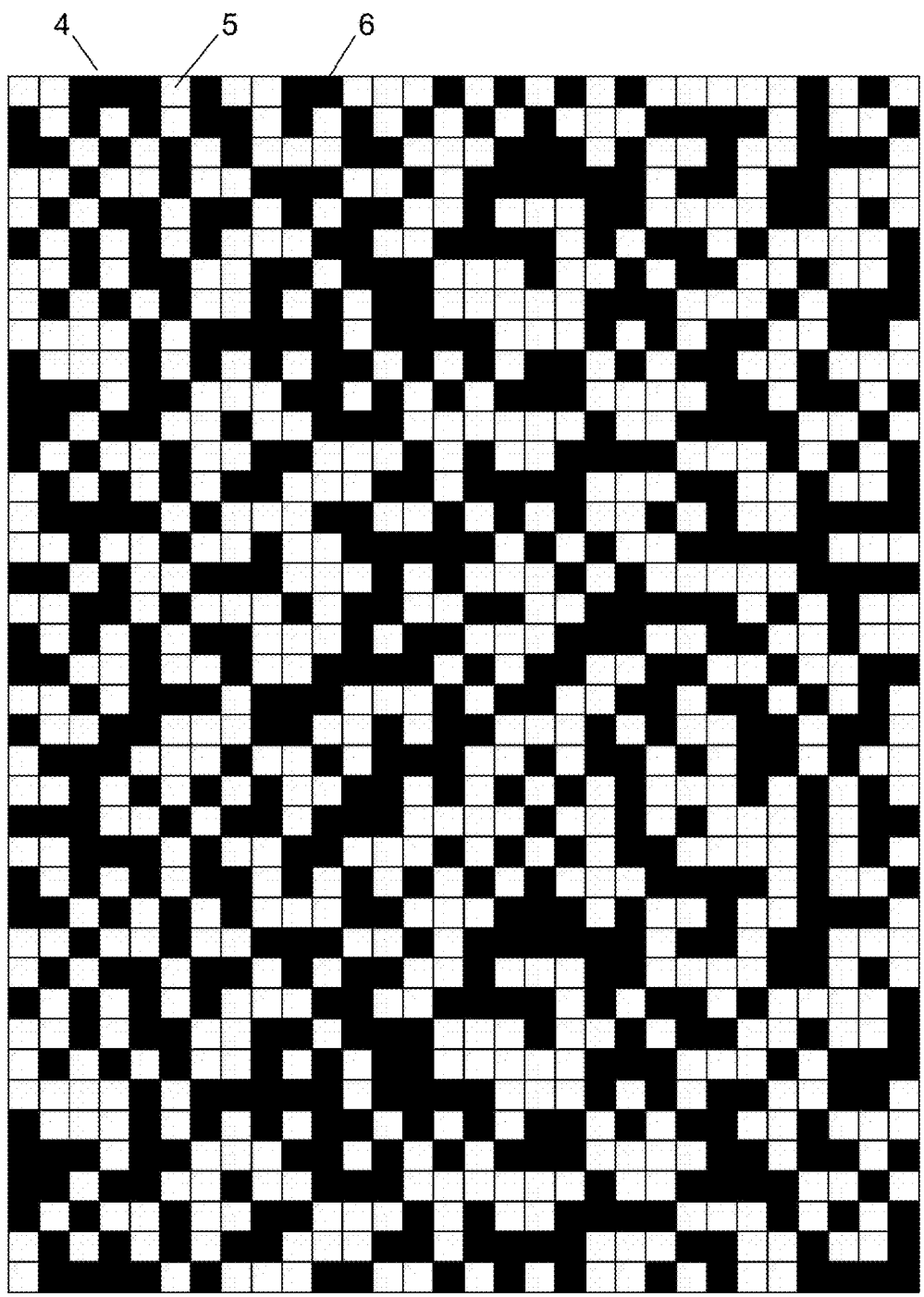

To further enhance security, one can stochastically define subfields in the at least one selected field 7 in the at least one background region, with inversion then taking place in these subfields only. Thereby, the information to be protected can be hidden still better, because a suitable selection of the size and distance of the subfields makes the resulting contrast ratio in visualization controllable. Let this be explained with the help of FIGS. 8a-8g. FIG. 8a, to begin with, shows a background raster 1 with light-radiating background raster elements of the first type 2 and light-radiating or light-blocking background raster elements of the second type 3, the latter here being designed in the light-blocking version. Correspondingly, FIG. 8b shows the foreground raster 4 with the completely light-transmissive foreground raster elements 5 and the light-attenuating foreground raster elements 6. This foreground raster 4 constitutes the key for encoding the background raster 1. It may be of a static design or else can be made switchable by means of an LC panel.

Figure 8C:
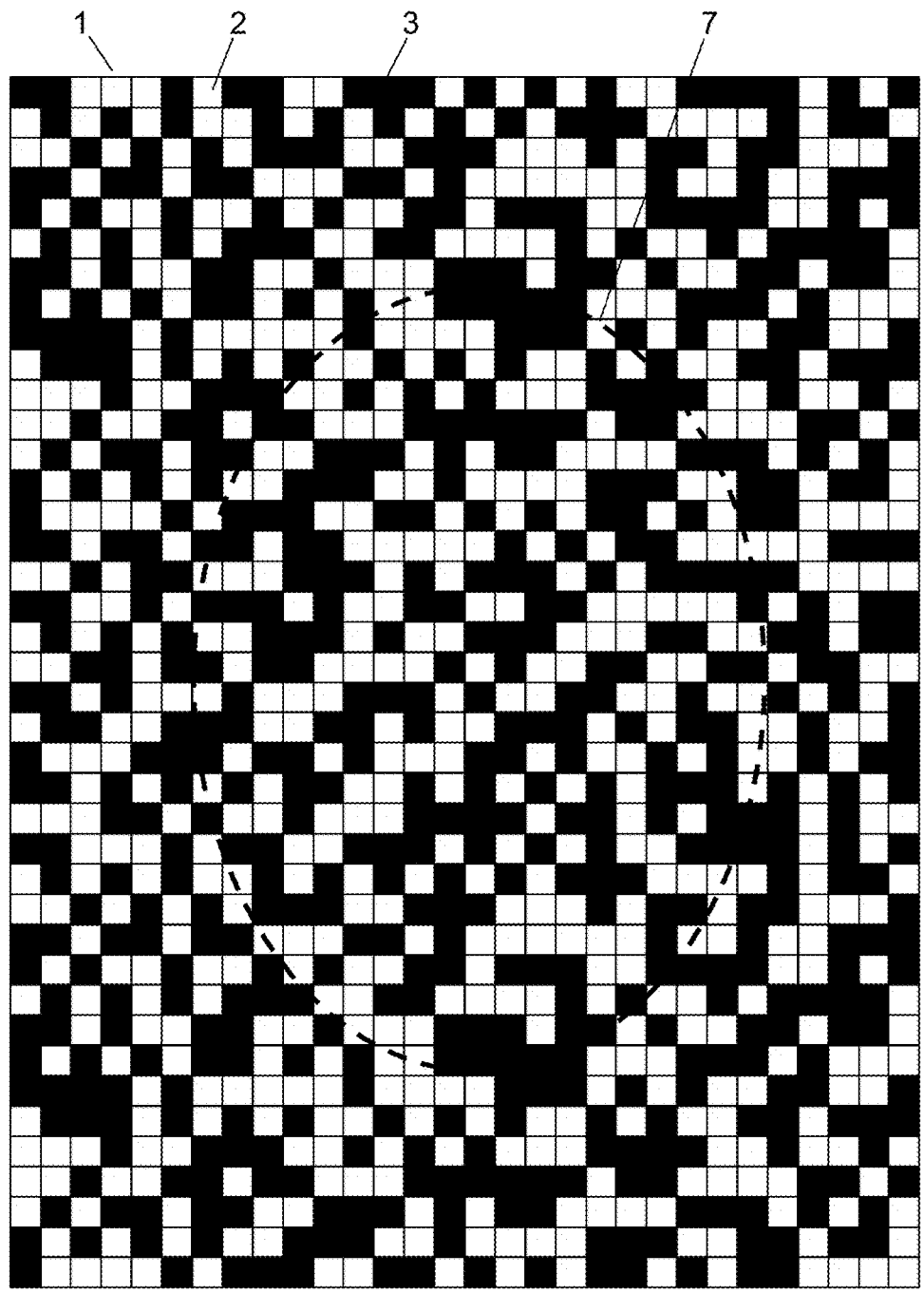
Figure 8D:
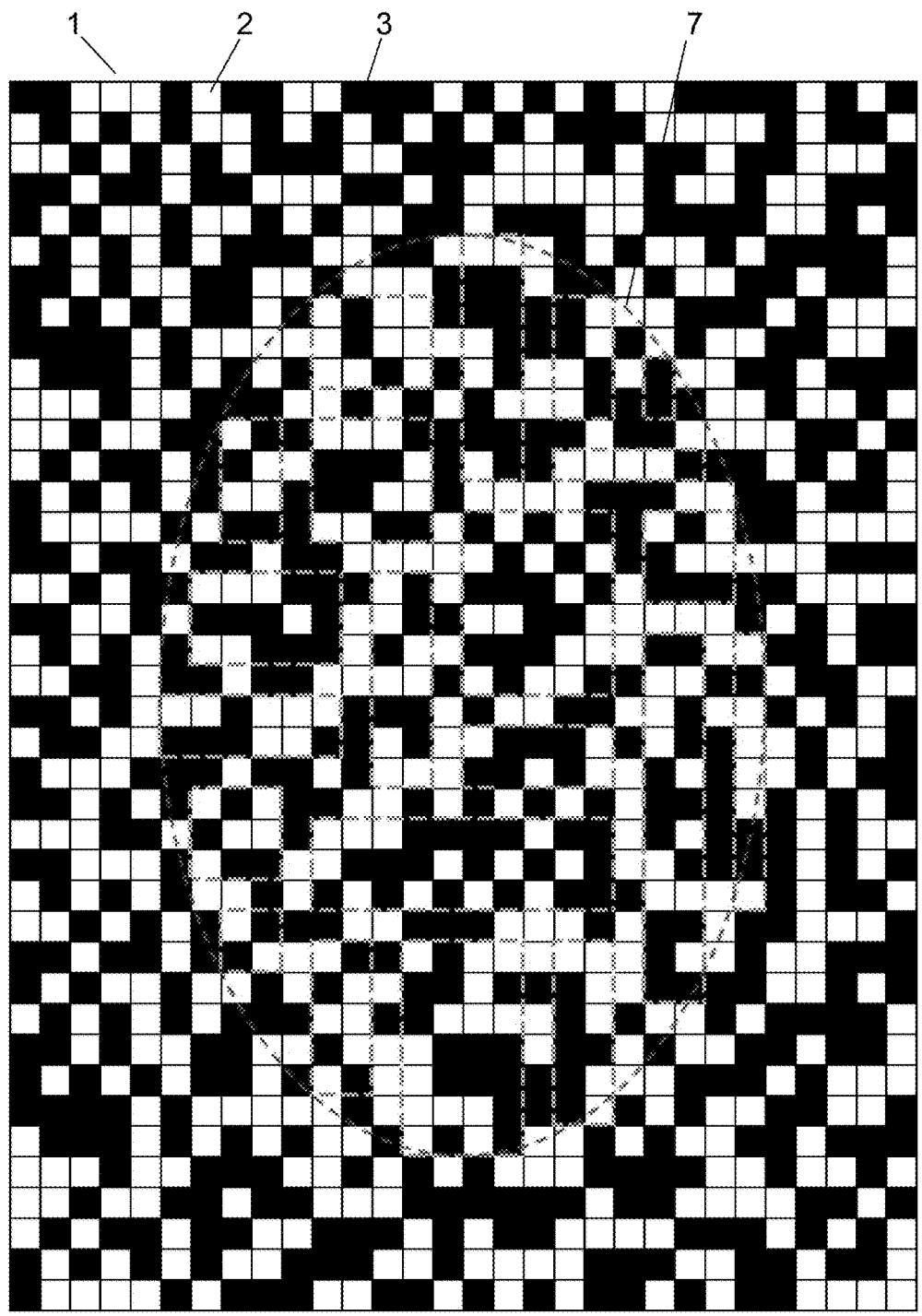
Figure 8E:
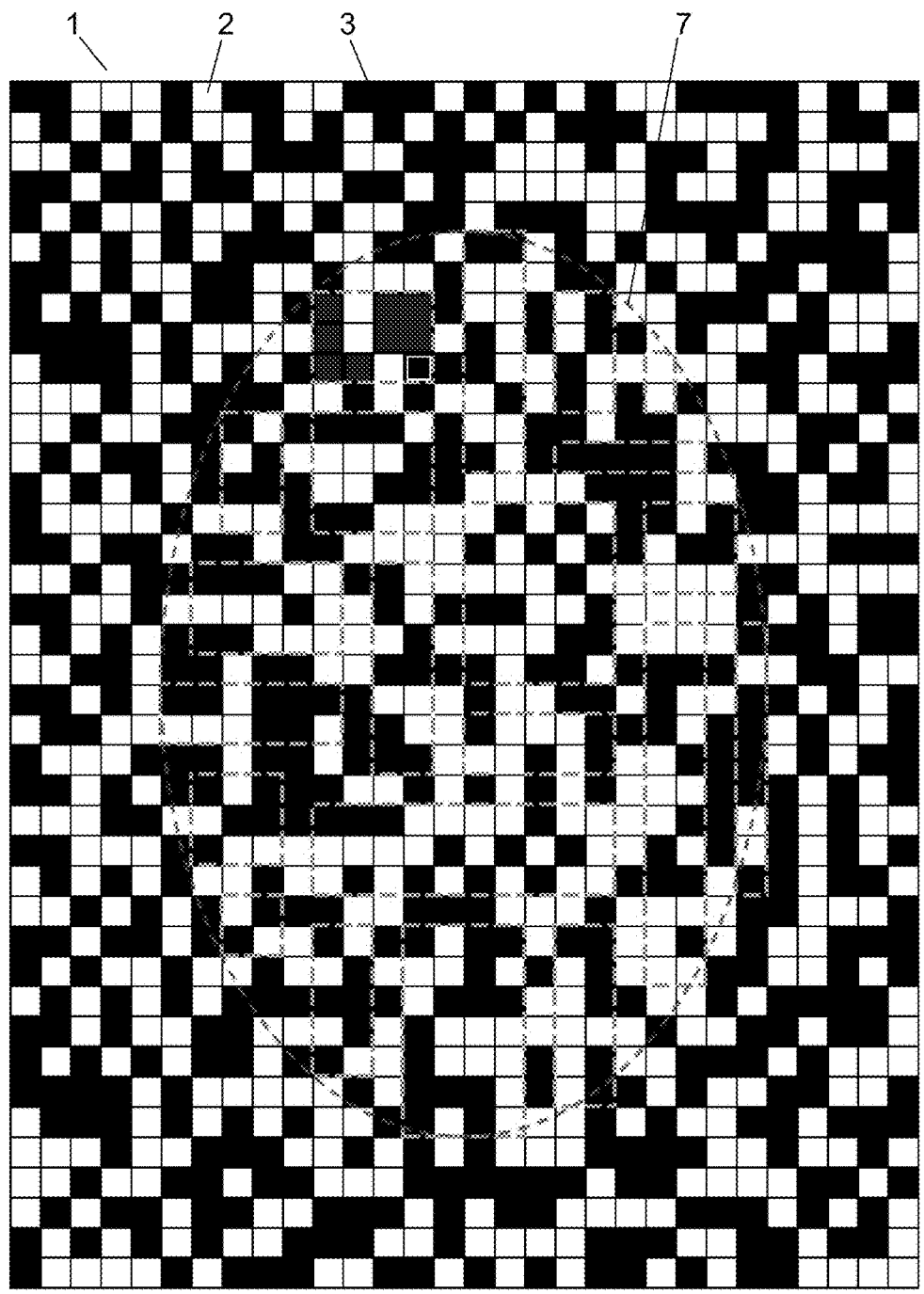
Figure 8F:
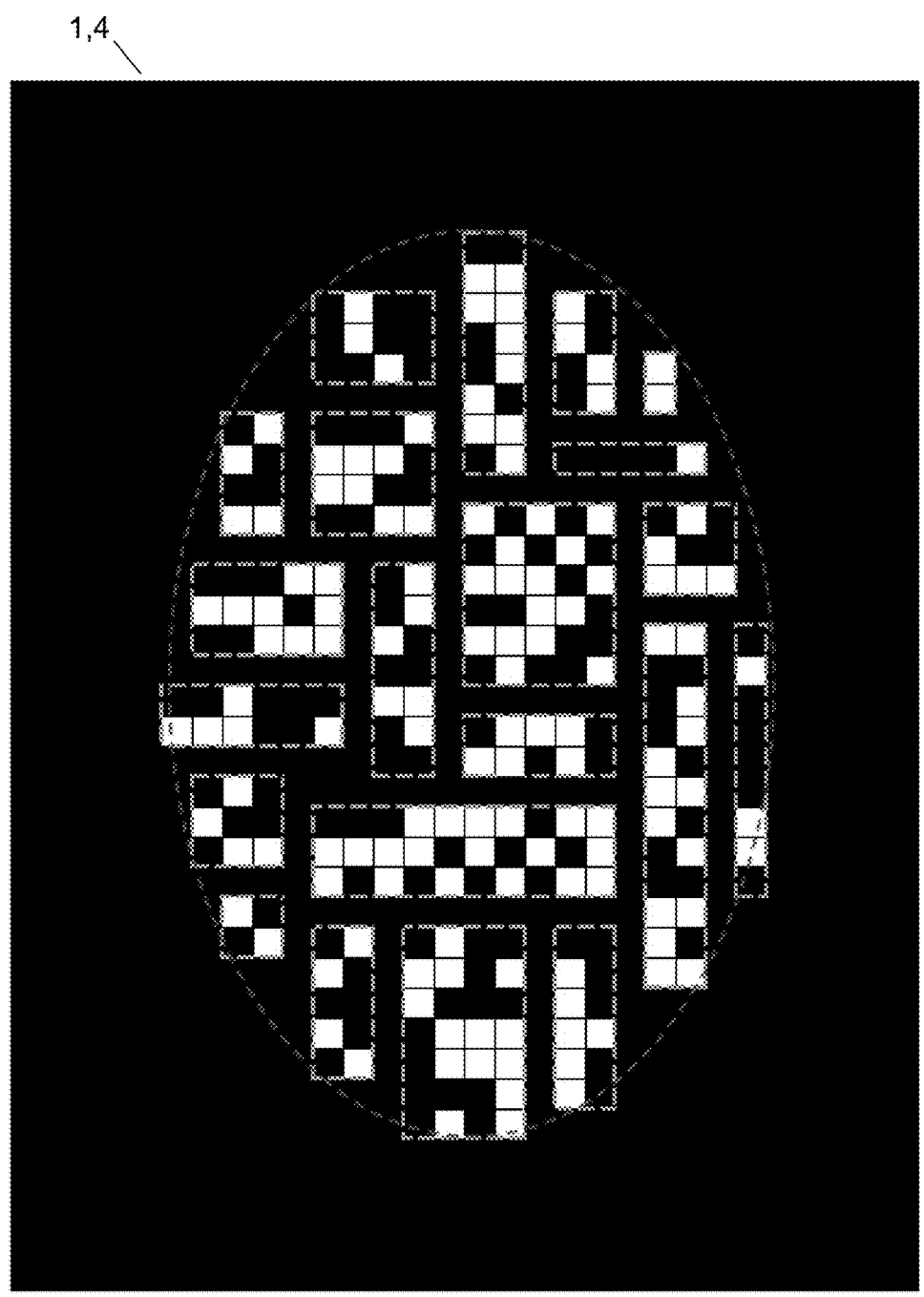
Figure 8G:
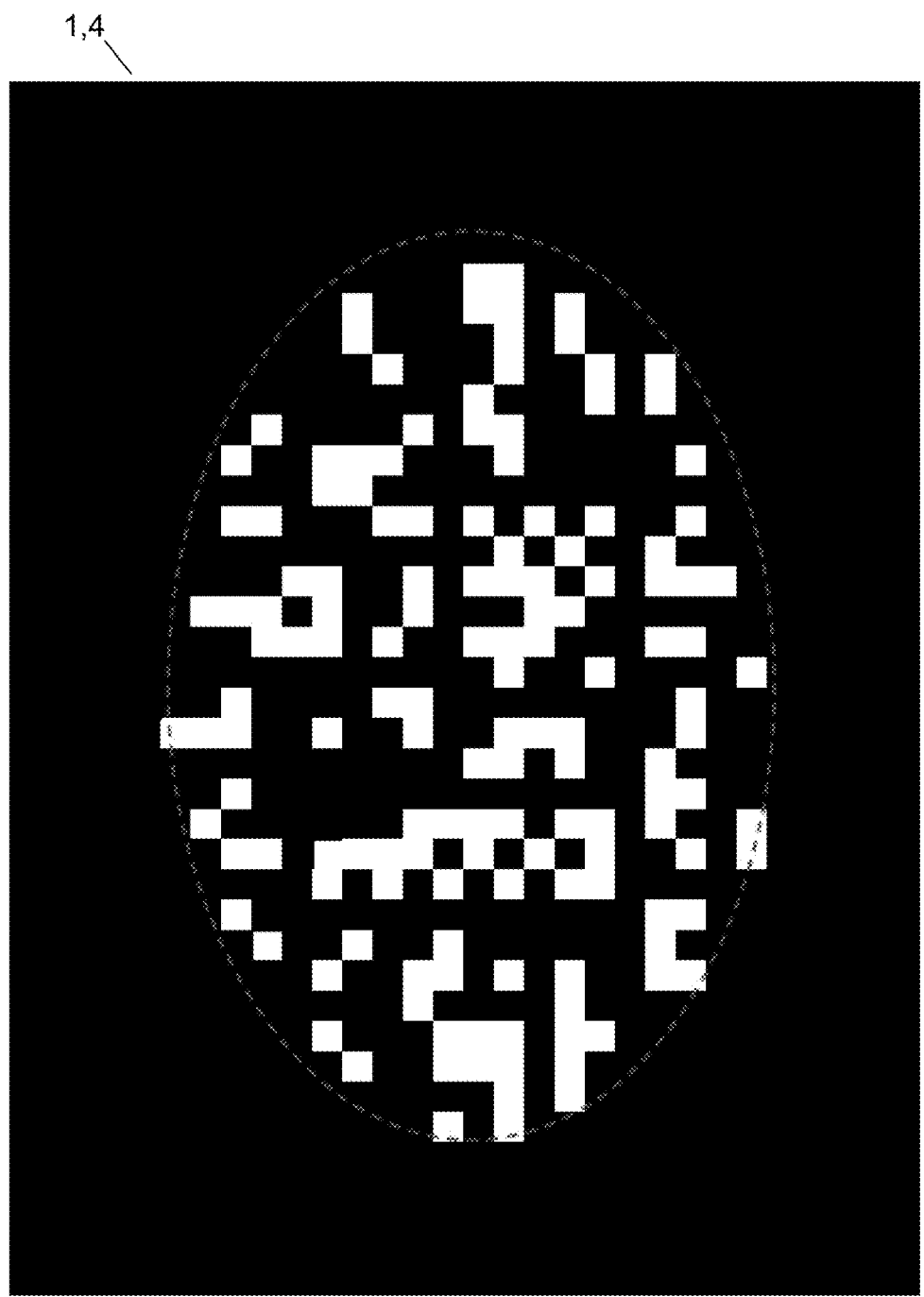

FIG. 8c shows the background raster 1 again. Shown in the background raster 1 is a selected field 7 which presents a piece of information. Here, the selected field 7 is approximately elliptical, delineated by a thick broken line. Within this selected field 7, now, subfields are defined stochastically in which inversion is to take place. This is suggested in FIG. 8d, where some regions of background raster elements are delineated by straight broken lines. It is only within these stochastically selected subfields that inversion takes place, i.e. a switching between light-radiating background raster elements of the first type 2 and light-radiating or light-blocking background raster elements of the second type 3. This is shown in FIG. 8e. FIG. 8f, finally, shows the superimposition of the background raster shown in FIG. 8e and the foreground raster shown in FIG. 8b. The same is shown again in FIG. 8g, but without the auxiliary lines that before marked the individual raster elements. Here again, then, a presentation rich in contrast is achieved, save that the share of light-blocking background raster elements 3 is higher than that of light-radiating background raster elements 2, for which reason the contrast is somewhat reduced compared to that achieved with inversion throughout the selected field 7.

By means of selecting the subfields, thus, one can control contrast. Here again, the total region shown constitutes the at least one background region or the at least one foreground region, respectively. Outside these regions, uncoded information can be presented that is visible from various viewing angles (not shown here).

Figure 10:
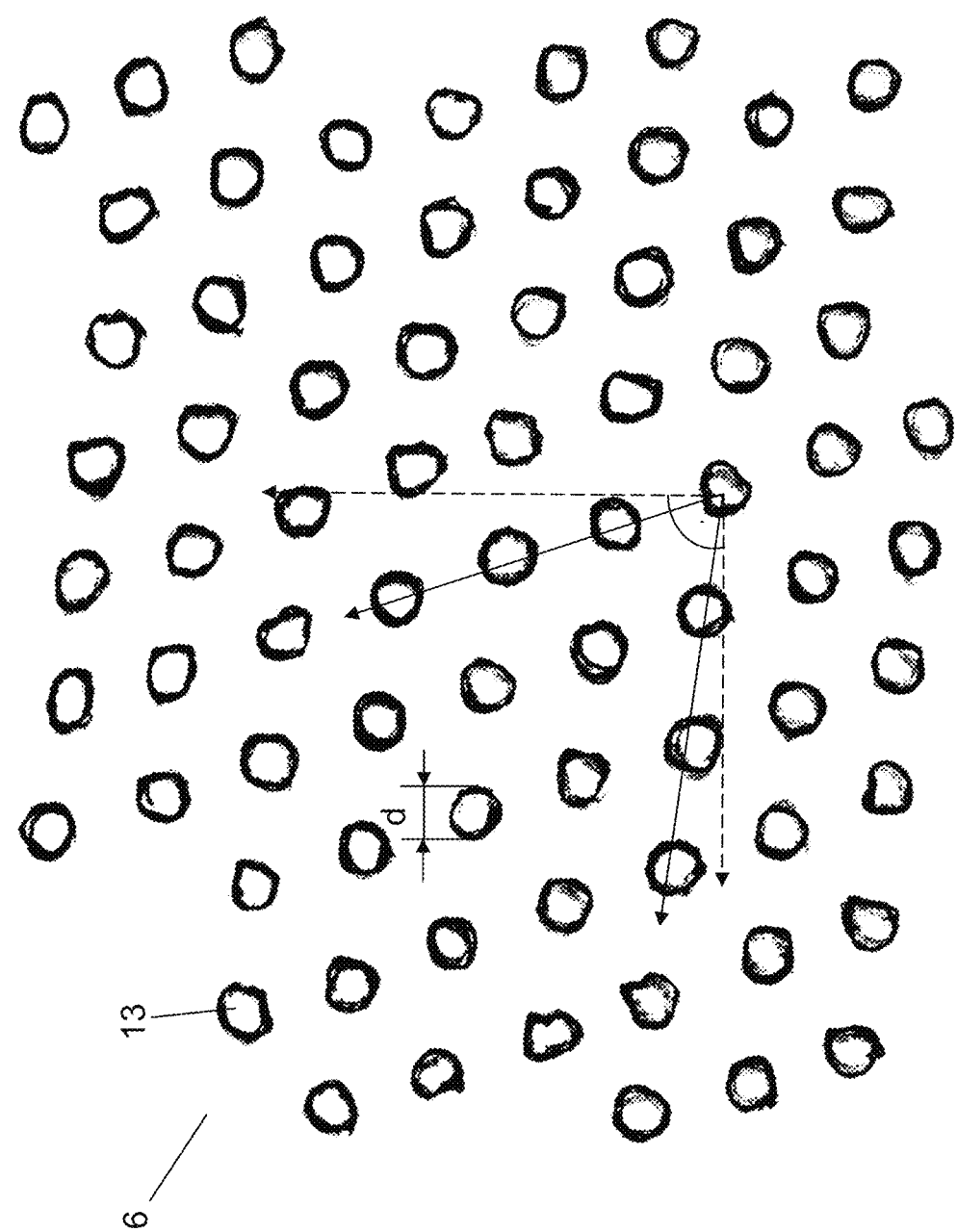
FIG. 10 shows an assembly of dot raster elements in a magnified view.

In a particularly preferred configuration, each individual light-attenuating foreground raster element 6 is an assembly of a great number of subraster elements 13 of different sizes and/or forms, regularly arranged in a subraster. This is shown in FIG. 9. The raster structures underlying the foreground raster 4—and, correspondingly, the background raster 1—each establish a grid with two mutually perpendicular grid axes, here symbolized by the broken lines. A subraster structure underlying the subraster establishes an affine grid, indicated by the two arrows, on each of which a row of subraster elements 13 is arranged. The angle between the two axes establishing the affine grid preferably deviates from 90° (because it is an affine grid) and with particular preference is 60°. Neither of the two grid axes of the affine grid coincides with one of the right-angled grid axes of the foreground raster 4 or of the background raster 1, respectively. The subraster elements 13 are, on average, of approximately circular shape, but in detail they deviate more or less from this circular shape, as shown in FIG. 10. FIG. 10 shows a highly magnified segment of a light-attenuating foreground raster element 6, so that the subraster elements 13 are well visible. The broken lines mark the coordinate axes of the foreground raster 4, while those of the affine grid established by the subraster are marked by solid arrows. The mean diameter d of all subraster elements is approximately 6 μm. The mean diameters of the approximately circular subraster elements 13 are distributed according to a Gaussian distribution with a full width at half maximum of about 1-3 μm. The grid pitch of the subraster elements 13 in either of the two affine directions is between 13 μm and 15 μm. If one assembles the foreground raster elements 5 from such subrasters or subraster elements 13, the image resulting from foreground and background raster is almost free from disturbance, as it is possible in this way to avoid linear and angular moirè patterns, which may appear if the foreground and background raster elements all have the same dimensions. For example, the subraster elements can be attached to a foreground substrate 10 that is designed as a photographic film and exposed through a suitable mask structure. Another possibility is to coat the foreground substrate 10 with an adhesive layer that cures under UV light, to expose only certain fields of the subraster elements 13 with UV-light—e.g., using a corresponding mask structure—and to wash out the fields not cured. Depending on design, the light-attenuating subraster elements 13 may then be hump-like or depression-like structures.

With the display screens described hereinbefore and the method implementable on them, it is possible to present security-relevant information within a small viewing angle range, so that it can only be seen by the person to which it is addressed, whereas security-irrelevant information can be presented with the full resolution of the display screen or the background raster so that it can be seen from a wide viewing angle range and, thus, from persons not involved.

LIST OF REFERENCE NUMBERS 1 background raster
2 light-radiating background raster element of the first type
3 light-radiating or light-blocking background raster element of the second type
4 foreground raster
5 completely light-transmitting foreground raster element
6 light-attenuating foreground raster element
7 selected field
8 source of illumination
9 background substrate
10 foreground substrate
11 raster substrate
13 subraster element
d diameter of a subraster element

What is claimed is:

1. A display screen, comprising
a background raster with a first type light-radiating background raster elements and a second type of light-radiating or light-blocking background raster elements; and
a foreground raster with completely light-transmissive foreground raster elements and light-attenuating foreground raster elements arranged in front of the background raster as seen from the direction of a viewer, the foreground raster being arranged at a specified distance from the background raster and oriented in a specified lateral position normal to the distance from the background raster, wherein in at least one foreground region of the foreground raster, the completely light-transmissive foreground raster elements and the light-attenuating foreground raster elements are stochastically distributed at a ratio of approximately 50:50, so as to serve as a key for encoding the background raster, wherein a basic encoding of the background raster is defined as an inverted distribution of the light-transmissive foreground raster elements and light-attenuating foreground raster elements in at least one background region corresponding to the foreground region, so that light-attenuating foreground raster elements correspond to the first type of light-radiating background raster elements, and the completely light-transmissive foreground raster elements correspond to the second type of light-radiating or light-blocking background raster elements, wherein in at least one selected field defining a piece of information, the distribution of light-blocking background raster elements and light-radiating background raster elements is, as against the basic encoding, at least partially inverted in the at least one background region as an encoding of the information, and wherein the lateral dimensions of the foreground raster elements, and the distance and the lateral position of the foreground raster relative to the background raster are matched to each other in such way that as viewer looking at the foreground raster perceives the encoded information as decoded only from one viewing direction or from a viewing angle range of up to ±50° about the viewing direction, due to a difference in contrast and/or color from such fields of the background raster that feature the basic encoding.

2. The display screen as claimed in claim 1, wherein the viewing angle range amounts to less than about ±30° in the viewing direction.

3. The display screen as claimed in claim 1, further comprising a control unit for triggering the background raster elements and/or foreground raster elements in order to change their transparency and/or color.

4. The display screen as claimed in claims 1, wherein the background raster is a first LC panel, and the background raster elements are full-color or monochrome pixels or subpixels of a color of the first LC panel.

5. The display screen as claimed in claim 1, wherein the foreground raster is a second LC panel or a transparent OLED display, and the foreground raster elements are full-color or monochrome pixels or subpixels of a color of the second LC panel.

6. The display screen as claimed in claim 1, wherein the foreground raster is static.

7. The display screen as claimed in claim 6, wherein the foreground raster is attached to a transparent foreground substrate.

8. The display screen as claimed in claim 7, wherein the background raster is a first LC panel, and the foreground substrate is a cover glass of the first LC panel.

9. The display screen as claimed in claim 6, wherein each individual foreground raster element is assembled from a multiplicity of subraster elements of different sizes and/or forms, regularly arranged.

10. The display screen as claimed in claim 9, wherein raster structures underlying the background raster and the foreground raster each establish a grid with two mutually perpendicular grid axes, and a subraster structure underlying the subraster establishes an affine grid, with the angle between two axes establishing the affine grid preferably amounting to 60°.

11. The display screen as claimed in claim 10, wherein the grid pitch of the subraster elements in each of the two affine directions is between 13 µm and 15 µm.

12. The display screen as claimed in claim 10, wherein neither of the two grid axes of the affine grid coincides with any of the rectangular grid axes.

13. The display screen as claimed in claim 9, wherein the subraster elements are generally circular in shape.

14. The display screen as claimed in claim 13, wherein the mean diameter of the subraster elements amounts to approximately 6 µm, and the diameters of the subraster elements arc distributed according to a Gaussian distribution with a full width at half maximum of 1 µm.

15. The display screen as claimed in claim 1, further comprising means for registering the viewer's viewing direction and for creating a movement to track the viewing direction by pixelwise or subpixelwise displacement of the at least one selected field in the at least one background region.

16. A method for the secure presentation of information on a display screen, in which;
light is radiated by a background raster with light-radiating background raster elements of a first type and light-radiating or light-blocking background raster elements of a second type; and
the light hits a foreground raster having completely light-transmissive foreground raster elements and light-attenuating foreground raster elements, with the foreground raster being arranged at a specified distance from the background raster and oriented in a specified lateral position normal to the distance from the background raster, wherein:
in at least one background region of the background raster the light-radiating background raster elements of the first type and the light-radiating or light-blocking background raster elements of the second type are stochastically distributed at a ratio of approximately 50:50, and the distribution is defined as a basic encoding of the background raster, wherein in at least one foreground region of the foreground raster, corresponding to the background region, a key is defined as inverted distribution of the light-radiating background raster elements of the first type and of the light-radiating or light-blocking background raster elements of the second type, so that light-attenuating foreground raster elements correspond to light-radiating background raster elements of the first type, and completely light-transmissive foreground raster elements correspond to light-radiating or light-blocking background raster elements of the second type, wherein at least one field in the at least one background region is selected which defines a piece of information, and the selected information is encoded by the distribution of the light-radiating background raster elements of the first type and of the light-radiating of light-blocking background raster elements of the second type in this the selected field, the selected information being at least partially inverted as against the basic encoding, and wherein the lateral dimensions of the foreground raster elements including the distance and the lateral position of the foreground raster relative to the background raster, are matched to each other in such $c_i$ way that a viewer looking at rise oreground raster perceives the encoded information only from one viewing direction or from a viewing angle range of up to ±50° about the viewing direction, due to a differenee in contrast and/or color from fields of the background raster not selected.

17. The method as claimed in claim 16, wherein the at least one field in the background region can be variably selected by means of a control unit.

18. The method as claimed in claim 16, wherein the basic encoding and the key are redefined before every action so that, in the at least one field, the distribution of light-radiating background raster elements of the first type and light-radiating or light-blocking background raster elements of the second type is at least partially inverted, or at specified or randomly chosen intervals.

19. The method as claimed in claim 16, wherein, in the at least one field in the at least one background region, subfields are defined stochastically, and an inversion takes place in the subfields.

20. The method as claimed in claim 16, wherein in areas of the background raster and of the foreground raster lying outside the at least one background region or outside the at least one foreground region, uncoded information is presented that is visible from various viewing angles.

21. The method as claimed in claim 16, wherein the viewer's viewing direction is detected and monitored through determination of the position of the eyes of the viewer, and in case of a change in eye position of the viewer, the foreground raster and the background raster are displaced relative to each other, or the at least one selected field in the at least one background region is displaced pixelwise or subpixelwise, whereby the viewing direction is made to follow the position of the eyes.

* * * * *

UNITED STATES PATENT AND TRADEMARK OFFICE
CERTIFICATE OF CORRECTION

PATENT NO. : 9,898,951 B2
APPLICATION NO. : 14/888339
DATED : February 20, 2018
INVENTOR(S) : Juergen Schwarz et al.

Page 1 of 1

It is certified that error appears in the above-identified patent and that said Letters Patent is hereby corrected as shown below:

In the Claims

Column 20, Line 14: delete "of" and insert --or--

Column 20, Line 15: delete "this"

Column 20, Line 22: delete "$c_i$" and insert --a--

Column 20, Line 22: delete "rise oreground" and insert --the foreground--

Signed and Sealed this
Eleventh Day of June, 2019

Andrei Iancu
*Director of the United States Patent and Trademark Office*